United States Patent
Martin

(10) Patent No.: US 9,631,901 B2
(45) Date of Patent: Apr. 25, 2017

(54) BALLISTIC SHIELD SUPPORT SYSTEM

(71) Applicant: SAM7988 LLC, Morristown, NJ (US)

(72) Inventor: Alejandro Martin, Morristown, NJ (US)

(73) Assignee: SAM7988 LLC, Morristown, NJ (US)

(*) Notice: Subject to any disclaimer, the term of this patent is extended or adjusted under 35 U.S.C. 154(b) by 0 days.

(21) Appl. No.: 15/298,048

(22) Filed: Oct. 19, 2016

(65) Prior Publication Data

US 2017/0038179 A1   Feb. 9, 2017

Related U.S. Application Data

(63) Continuation-in-part of application No. 14/720,859, filed on May 25, 2015, which is a continuation of application No. 13/760,959, filed on Feb. 6, 2013, now Pat. No. 9,038,522.

(60) Provisional application No. 61/595,357, filed on Feb. 6, 2012.

(51) Int. Cl.

| | |
|---|---|
| *F41H 5/013* | (2006.01) |
| *F41H 5/08* | (2006.01) |
| *F41H 5/18* | (2006.01) |
| *F16M 11/28* | (2006.01) |
| *F16M 11/20* | (2006.01) |

(52) U.S. Cl.
CPC ........... *F41H 5/08* (2013.01); *F16M 11/2078* (2013.01); *F16M 11/28* (2013.01); *F41H 5/013* (2013.01); *F41H 5/18* (2013.01); *F16M 2200/028* (2013.01)

(58) Field of Classification Search
CPC ... F41H 5/013; F41H 5/06; F41H 5/08; F41H 5/10; F41H 5/12; F41H 5/24

USPC ............................................. 89/36.07, 36.15
See application file for complete search history.

(56) References Cited

U.S. PATENT DOCUMENTS

| | | |
|---|---|---|
| 1,320,888 A | 11/1919 | Miller |
| 1,611,814 A | 12/1926 | Butler |
| 2,306,708 A | 12/1942 | Mendel |
| 4,867,273 A | 9/1989 | Schaevitz |
| 5,293,807 A | 3/1994 | Hajdu |

(Continued)

FOREIGN PATENT DOCUMENTS

| | | |
|---|---|---|
| CA | 2310196 A1 | 11/2000 |
| GB | 4376 | 0/1915 |

(Continued)

OTHER PUBLICATIONS

"K0632_B Inch—Indexing Plungers pull knob all stainless steel, Style B, inch", KIPP Inc. 2016, Retrieved from: http://www.kipp-usa.com/us/en/Products/Indexing-Plungers/Indexing-Plungers/K0632-Indexing-Plungerspull-knob-stainless-steel/K0632-B-Inch-Indexing-Plungers-pull-knob-all-stainless-steel-Style-B-inch.html; Retrieved on Jun. 28, 2016 (2 pages total).

*Primary Examiner* — Stephen M Johnson
(74) *Attorney, Agent, or Firm* — Maldjian Law Group LLC

(57) ABSTRACT

The invention features a support system which can be attached to a ballistic shield. The system features at least one telescoping or retractable leg which is mounted to the shield to create a standalone shield. The shield is positioned between plates which receive pins that hold the shield in position in the system. The system features a resting platform which provides an area for resting a gun or rifle, for example. A bullet proof screen extends from the bottom area of the shield towards the base of the system and provides additional security to the user when the shield is in the system.

18 Claims, 25 Drawing Sheets

(56) References Cited

U.S. PATENT DOCUMENTS

| | | | |
|---|---|---|---|
| 5,340,189 | A | 8/1994 | Goodman |
| 5,345,706 | A | 9/1994 | Brown |
| 7,841,269 | B1 | 11/2010 | Jacobs |
| 2002/0104429 | A1 | 8/2002 | Euler |
| 2005/0235819 | A1 | 10/2005 | Long |
| 2006/0230916 | A1 | 10/2006 | Sand |
| 2010/0218670 | A1 | 9/2010 | Keng |
| 2011/0011255 | A1 | 1/2011 | Kleniatis et al. |
| 2012/0152101 | A1* | 6/2012 | Engleman ............... F41H 5/026 89/36.08 |
| 2015/0033990 | A1* | 2/2015 | Yeager ..................... F41H 5/08 108/15 |

FOREIGN PATENT DOCUMENTS

| | | |
|---|---|---|
| GB | 2221286 A | 1/1990 |
| WO | 2010048391 A2 | 4/2010 |

* cited by examiner

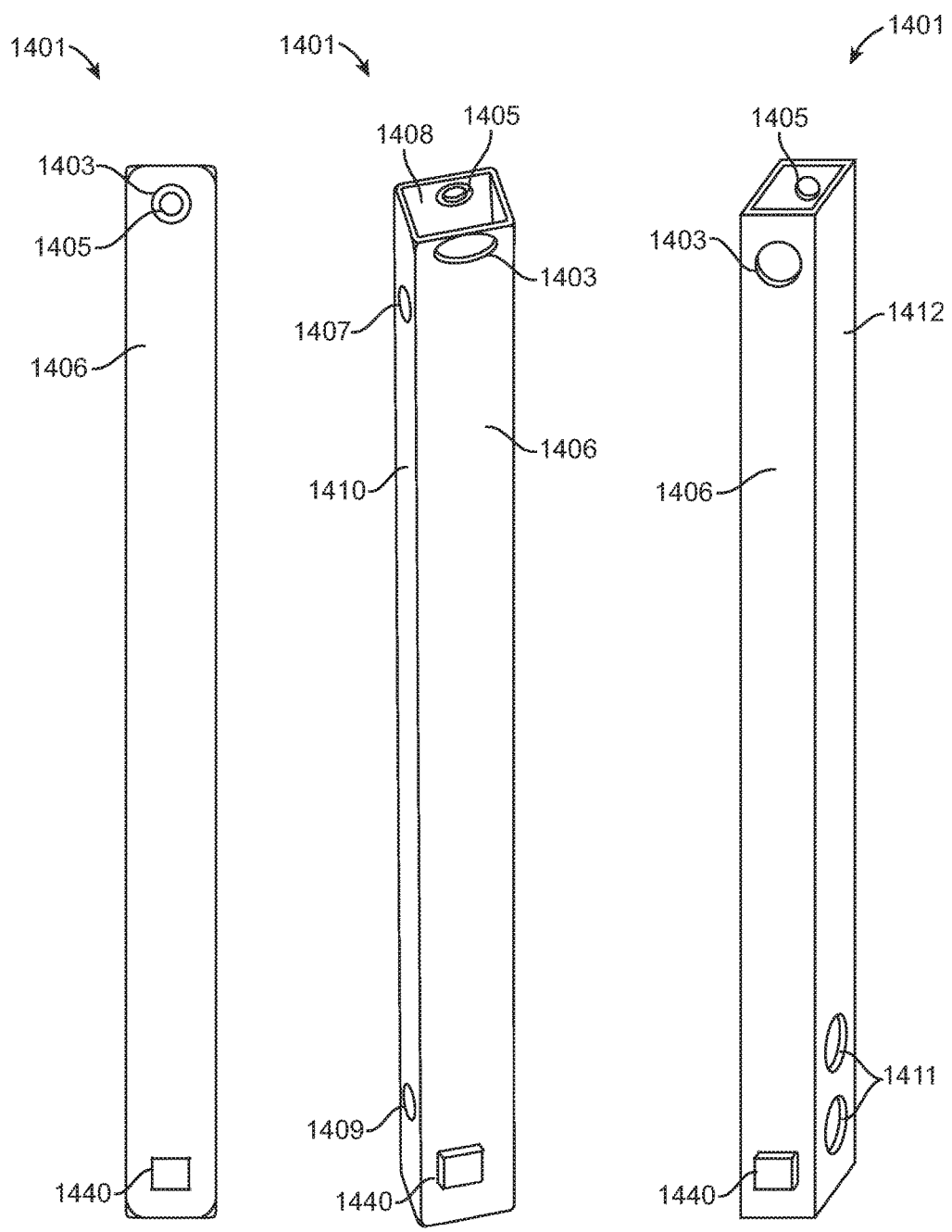

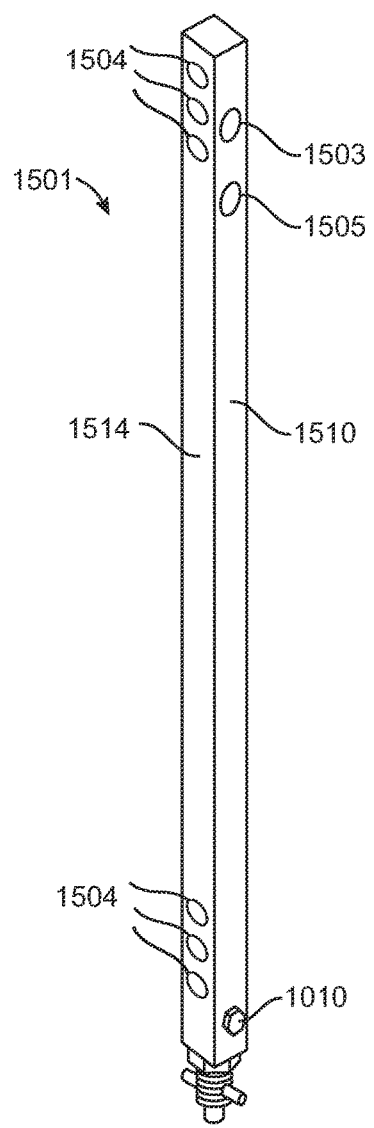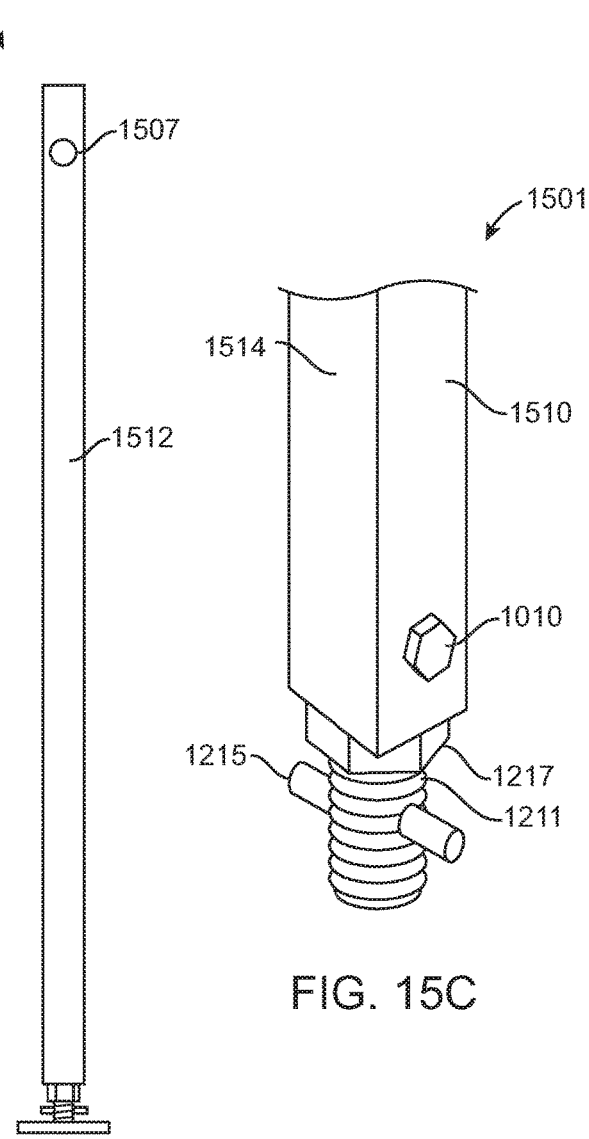
FIG. 15A  FIG. 15B  FIG. 15C

BALLISTIC SHIELD SUPPORT SYSTEM

CROSS-REFERENCE TO RELATED APPLICATIONS

This application is a continuation in part of U.S. patent application Ser. No. 14/720,859 filed May 25, 2015, which in turn claims the benefit of U.S. patent application Ser. No. 13/760,959 filed Feb. 6, 2013, entitled "SHIELD SUPPORT SYSTEM," now U.S. Pat. No. 9,038,522, which claims priority to U.S. Provisional Application Ser. No. 61/595,357 filed Feb. 6, 2012, entitled "SHIELD SUPPORT SYSTEM," all of which are incorporated herein by reference in its entireties.

FIELD OF THE INVENTION

The present invention relates, in general, to an extendable and retractable support which attaches to a ballistic shield so that the shield can stand alone.

BACKGROUND OF THE INVENTION

A ballistic shield or tactical shield is a hand-held shield that is capable of defending the user from handguns, shotguns and submachine guns. They are typically used by law enforcement or military during dangerous life or death situations. The average shield weighs at least about 20 to 40 pounds and is held by a user for a minimum time of 15 to 20 minutes. It is difficult to hold the shield in an upright position without getting fatigued and without having a sore arm from supporting the weight of the shield. Being fatigued and having sore arms may cause the user to be more vulnerable in a dangerous situation. The fatigue and soreness causes the user to pass the shield to his partner exposing the user to an immediate deadly threat.

SUMMARY OF THE INVENTION

The present invention provides a support system that can be attached to a ballistic shield or a riot shield so the user can use the system when fatigued, sore or immobile and then collapse the system when the user desires to be mobile.

An aspect of an embodiment of the invention provides plates which mount retractable legs to the ballistic shield affording the shield the ability to be raised and lowered to a desired height.

A further aspect of an embodiment of the invention features a base provided between the legs to provide additional support and stability.

A further aspect of an embodiment of the invention features a bullet proof screen extending from the bottom of the shield to the base of the support system.

A further aspect of an embodiment of the invention features an internal sleeve that receives and supports the legs.

A further aspect of an embodiment of the invention features a resting platform which affords the user the ability to rest his rifle.

A further aspect of an embodiment of the invention features a hydraulic system that raises and lowers the legs.

A further aspect of an embodiment of the invention features a spring-loaded system that raises and lowers the legs.

Additional aspects, objectives, features and advantages of the present invention will become apparent from the following description of the preferred embodiments with reference to the attached drawings.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components.

FIGS. 14A-14C are views of a sleeve in accordance with an embodiment of the present disclosure.

FIGS. 15A-15C are views of a leg in accordance with an embodiment of the present disclosure.

Figure 1:
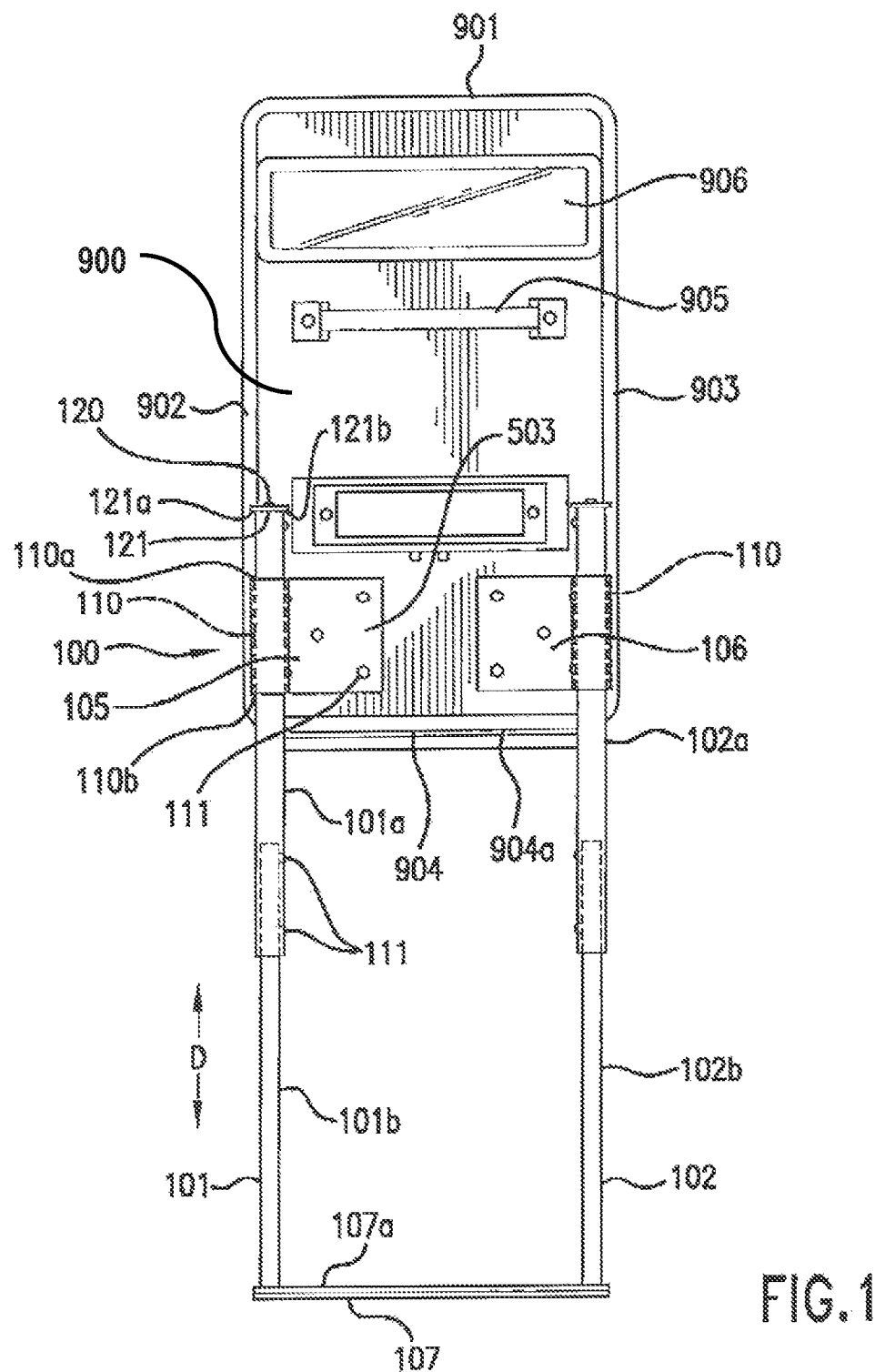
FIG. 1 is a perspective view of an embodiment of the present invention showing the support system having two legs.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise. Features illustrated in the drawings are not drawn to scale unless described either explicitly or clearly in context as being drawn to scale.

DETAILED DESCRIPTION OF THE INVENTION

FIG. 1 is a perspective view of an embodiment of the present invention showing the support system 100 having two legs 101, 102. The support system 100 features two mounting plates 105, 106 positioned on the left and right side of the shield 900, respectively. The shield 900 has a top side 901, left side 902, right sides 903 and bottom sides 904. A typical ballistic shield 900 has four straight sides with curved or straight edges. The shield 900 is a hand-held shield with a strap 905 that is capable of defending the user from handguns, shotguns and submachine guns. The shield is shaped sheet metal or a para-aramid synthetic fiber (i.e., Kevlar™), or the like, with a relatively thin eye slot hole 906 of bulletproof glass for vision.

Figure 10:
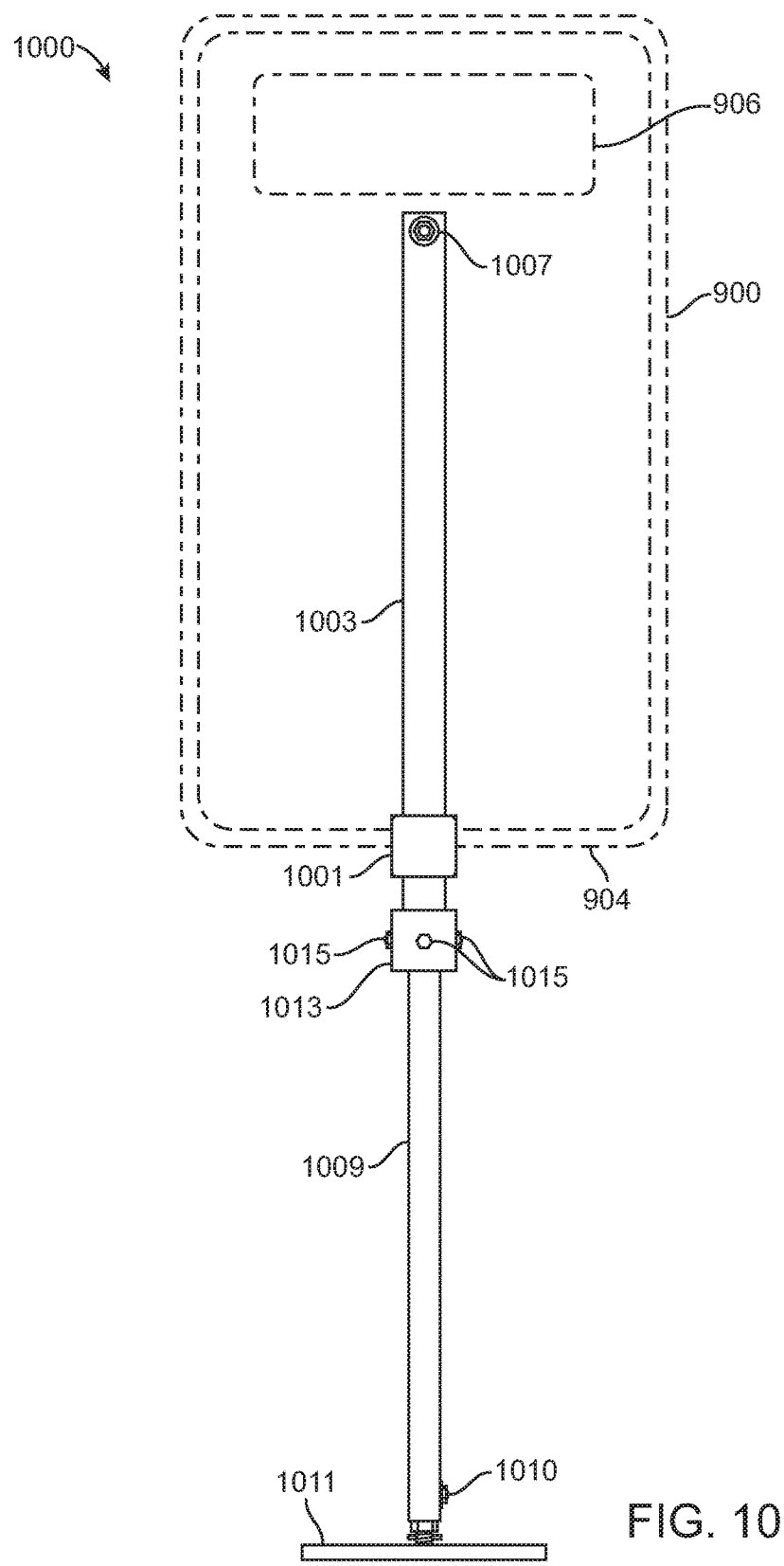
FIG. 10 is an oblique view of an embodiment in an extended configuration with ballistic shield in phantom, in accordance with the present disclosure.

Support system 100 also is usable to support a riot shield (not illustrated in FIG. 10). A riot shield may have physical similar dimensions to ballistic shield 900, and will be supported similarly to ballistic shield 900. However, a riot shield is designed to protect a person from direct physical assault (e.g., along a protest line), or against relatively low-velocity projectiles such as thrown rocks, bottles, bodily fluids, and so forth. In contrast, a ballistic shield protects a person from ballistic threats (e.g., gunshots). Consequently, a riot shield does not need to be as strong as a ballistic shield, so the riot shield may be constructed from lighter and less strong materials, or thinner materials, in order to reduce weight of the riot shield.

Figure 5:
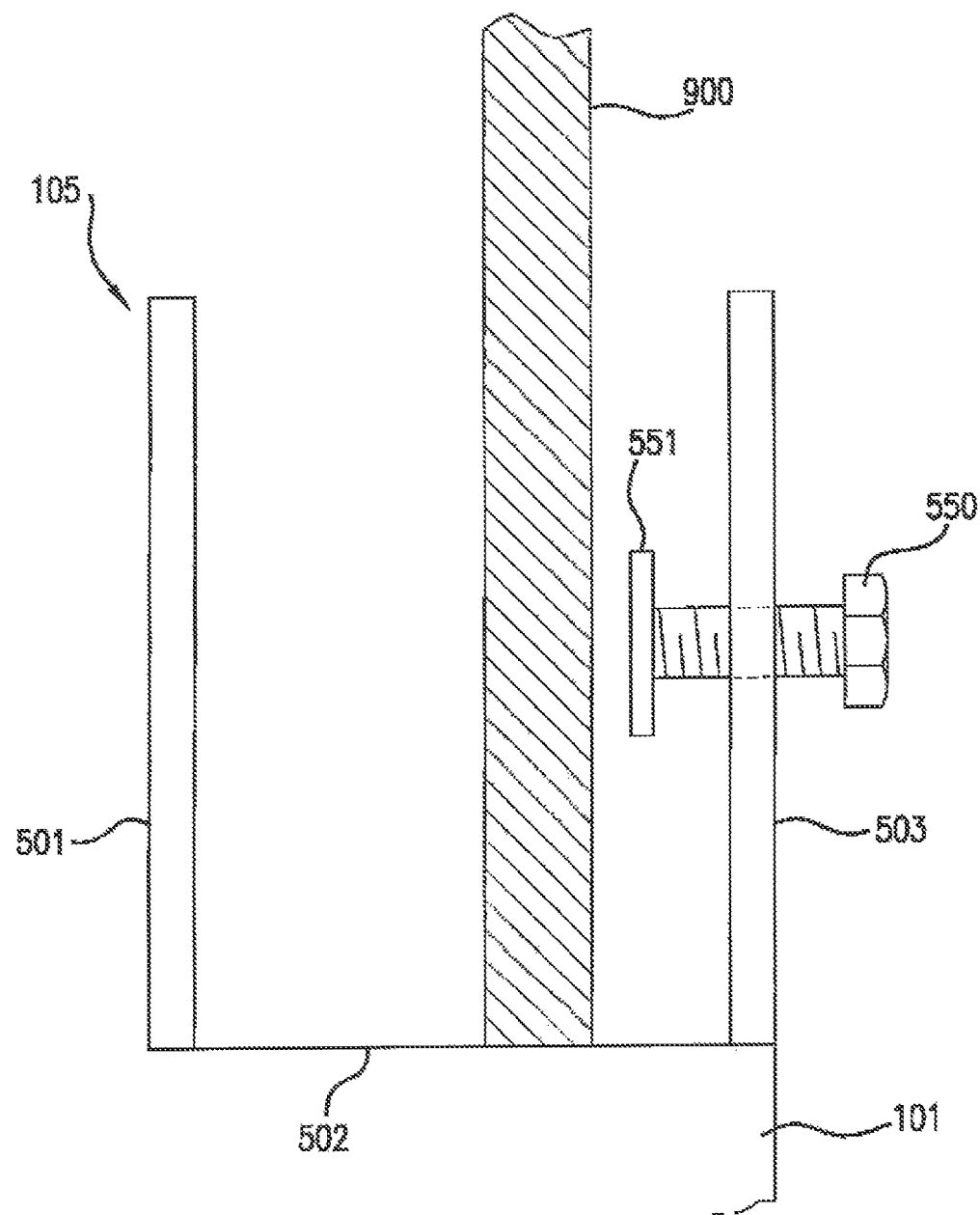
FIG. 5 is a perspective view of the present invention showing the shield being positioned between a mounting plate.
Figure 6:
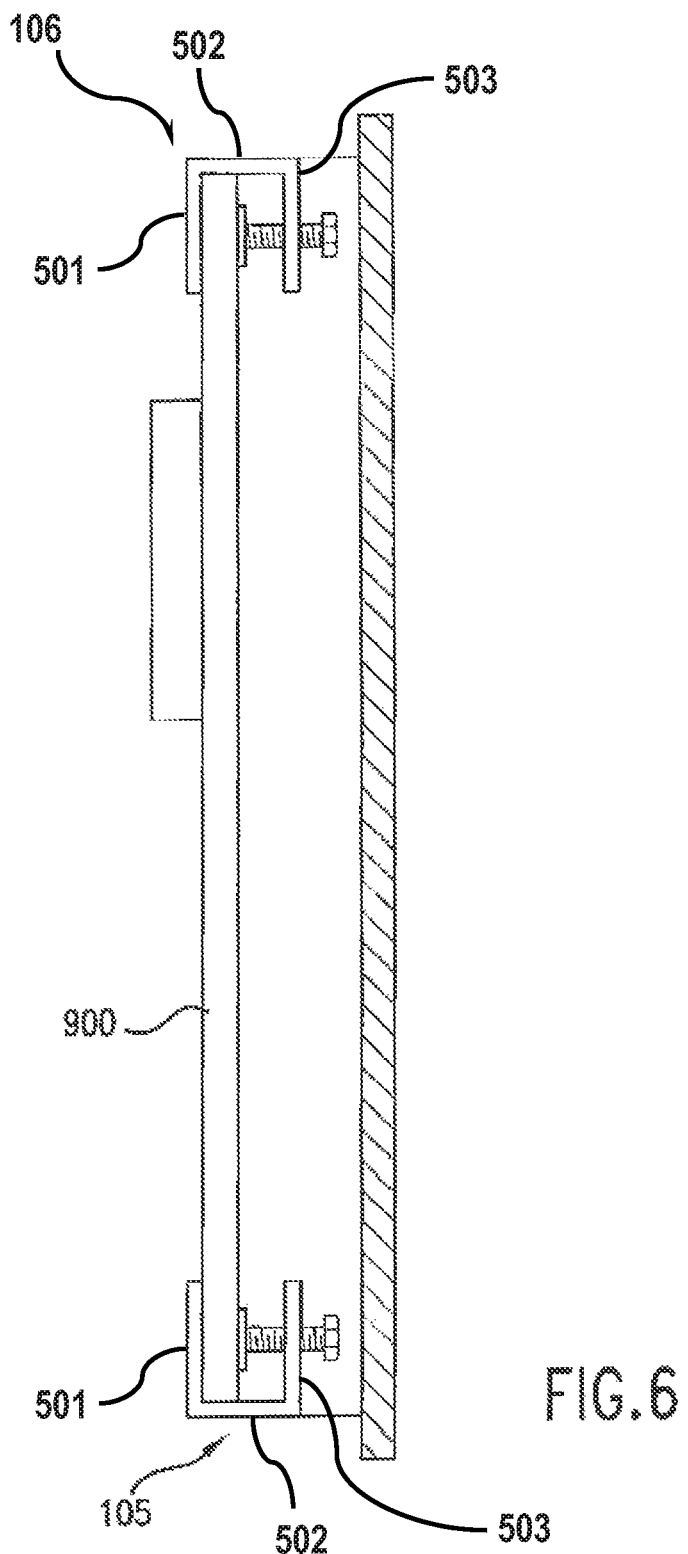
FIG. 6 is a perspective view of the present invention showing the shield support system attached to the shield by bolts.

In one embodiment, the plates can be mounted to the shield 900 using ½" stainless steel bolts and nuts 111. The plates 105, 106 are mounted near the bottom area of the shield 900. FIG. 5 is a perspective view of the present invention showing the shield being positioned between a mounting plate 105. Plates 105 and 106 are identical so only plate 105 will be described. The plates 105, 106 comprise a plate base 502 and a left plate side 501 and right plate side 503, where the right plate side 503 extends upward from the front of the base 502 and the left plate side 501 extends upward from the back end of the base 502. The right plate side 503 has openings that receive pins 550 having a thin plate or cap 551 on an end. The pins 550 extend through the openings towards the shield 900. So that the structure and integrity of the shield is not compromised, the pins are not inserted through the shield. Instead, the plate or cap 551 abuts the surface of the shield and holds the shield inside of the support system 100, as shown in FIG. 6. FIG. 6 is a perspective view of the present invention showing the shield support system attached to the shield by bolts. The left plate side 501 is symmetrical to the right plate side 503 and has aligning holes to receive pins to hold the shield's opposite side in place. The base 502 helps prevent the shield from shifting left or right when supported by the system. The plates are somewhat of a u-shaped structure. As shown in FIG. 1, two plates 105 and 106 are shown supporting a shield 900. The left side 902 of the shield and the right side 903 of the shield aligns with the base 502. The right plate side 503 aligns with the front side of the shield. The left plate side 501 aligns with the back side of the shield. Alternatively, a third plate 107 is shown where the bottom side 904 of the shield abuts with the inside base 502 and the left and right sides 501, 503 receive pins through its openings to secure the shield in place.

Each plate 105, 106 supports a leg 101, 102 that extends downward a length from a middle area of the shield to a base or foot plate 107. The base 107 is positioned between the legs 101, 102 and adds additional support to the shield 900 when the legs 101, 102 are extended. The base is perpendicular to the legs and helps to support the system. The base is preferably ¼"×2"×19" made from aluminum. However, alternate sizes and materials may be used which are durable. The legs 101, 102 are telescoping such they are adjustable a range of heights. Sleeves 110 at least the height of the plates 105, 106 are on the plates. The legs 101, 102 pass through the sleeves. The sleeves minimize damage to the plates 105, 106 as the legs pass through the sleeves. The sleeves 110 also help to guide the legs when moved in an up and down direction D. When the legs 101, 102 moved up to its maximum height, the base plate 107 abuts the bottom 904a of the shield and the user can use the straps 905 on the shield 900 to carry the shield 900. When the legs are fully retracted, the shield can be transported to a different area.

Figure 9:
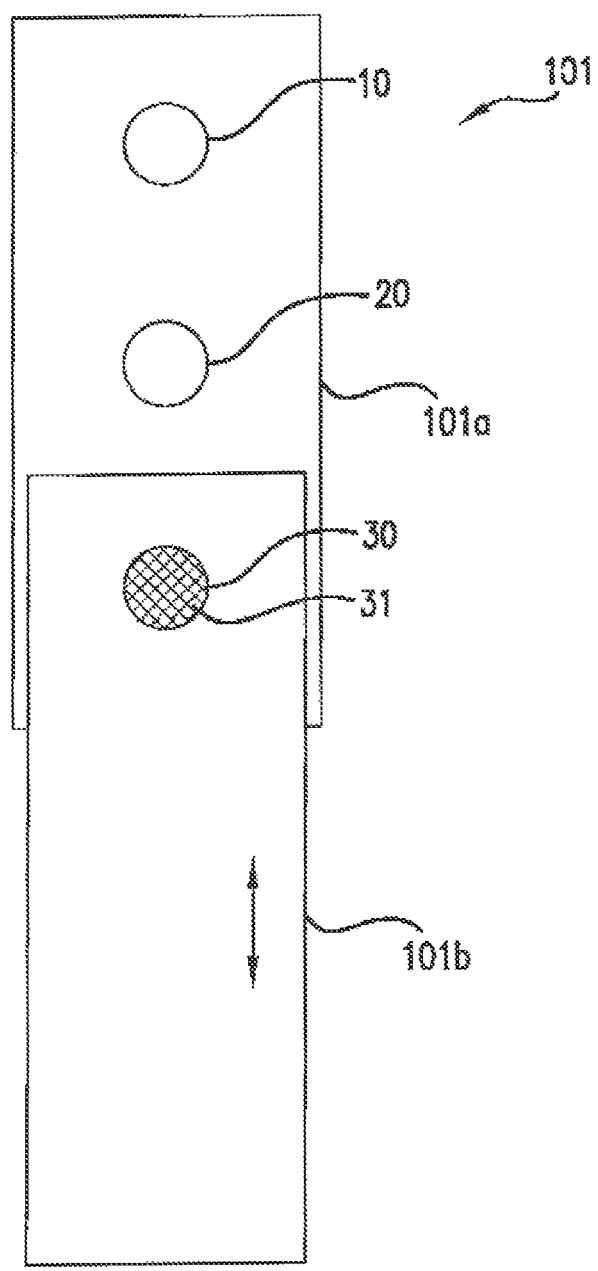
FIG. 9 is an illustration of a top and bottom portion of a leg.

A removable aluminum cap 120 is featured on the top end 121 of the legs 101, 102. The cap 120 can be opened to access the legs for servicing of the legs or for cleaning inside of the legs. The cap 120 ends extend over the edges 121a, 121b and abuts the top end 110a of the sleeve 110. The sleeve 110 is open at the bottom end 110b so that the legs 101, 102 pass through the sleeve 110 easily. The legs 101, 102 are secured to the base 107 so that when the bottom portion of the legs 101b, 102b are moved upward and pass through the sleeves 110, the connected base 107 is moved upwards so that the top surface 107a of the base contacts the bottom 904 of the shield 900. The top portions 101a, 102a of the legs receive the bottom portion 101b, 102b of the legs so that the bottom portion is secured inside of the top portions of the legs, as shown in FIG. 9. FIG. 9 is an illustration of a top and bottom portion of a leg. The top portion 101a of the leg 101 has openings 10, 20, 30. The bottom portion 101b of the leg 101 features spring loaded pin 31 that adjusts the height of the bottom portion of the leg. The spring loaded pin 31 is shown protruding through opening 30 in FIG. 9 securing the leg in an extended position. The top portion 101a of the leg 101 features openings on a second top portion side, wherein the spring loaded pin 31 extends through the second opening 10 to keep the bottom portion of the leg inside the top portion of the leg. The first opening 10 is at least the length of the bottom portion 101*b* of the leg so that entire bottom portion is concealed inside of the top portion.

The legs and base can be moved upwards so they do not interfere with the shield when the support system is not desired by the user. The base 107 is rubber so that it can somewhat grip the ground surface the system and connected shield are placed onto. A lower position on the legs feature additional nuts and bolts 111 to provide stability when the legs are extended.

Figure 2:
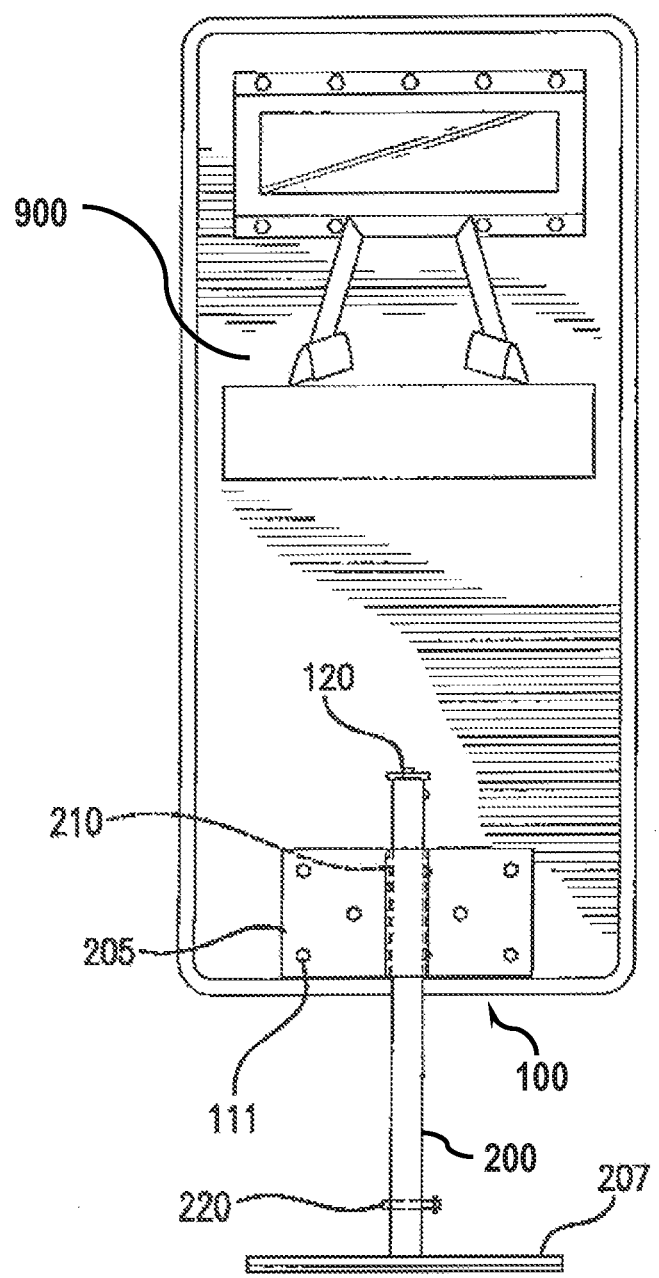
FIG. 2 is a perspective view of an embodiment of the present invention showing the support system having one leg.

FIG. 2 is a perspective view of an embodiment of the present invention showing the support system 100 having one leg 200. A mounting plate 205 is positioned in a middle bottom area of the sleeve 210 and secured to the shield using nuts and bolts 111, for example. The mounting plate 205 is configured like plates 105 and 106 discussed above. The shield is positioned between the left and right plate sides and held in place with screws whose ends touch the outside surface of the shield, but do not penetrate the shield. The plate is preferably ⅛"×6"×12"; however, alternate dimensions may be used depending on the size of the shield 900. The sleeve 210 is positioned in the middle of the place and supports one leg 200 that can be moved through the sleeve 210, as described above. A pin 220 is positioned near the bottom of the leg. The pin 220 is received through an opening on the leg 200 and locks the leg in a closed position, shown in FIG. 2. The leg 200 is supported by a rubber ¼"×2"×12" base plate 207, as described above. The leg 200 is secured to the base plate 207 such that the base plate and leg are moved upward and the base plate aids in securing the leg inside of the sleeve. Alternatively, the base plate may be removable having an opening sized to receive the bottom of the leg to support it, where the leg ends would fit inside an opening on the base plate.

Figure 4:
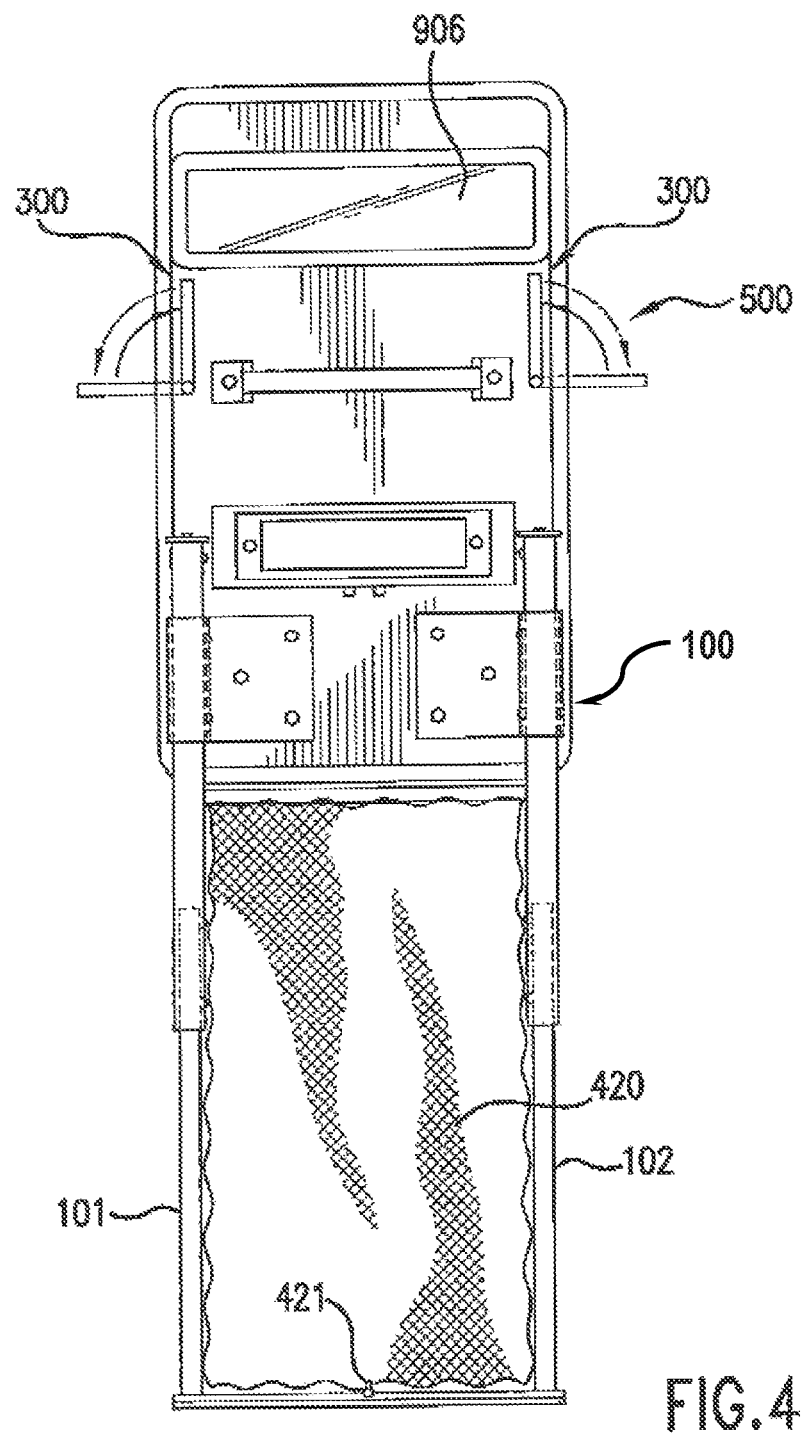
FIG. 4 is a perspective view of the present invention showing the support system having two legs and a resting platform.

A bullet proof screen 420, as shown in FIG. 4 can be positioned onto the legs of the support system 100 and moved in a downward position towards the base plate. The screen is sufficiently bullet resistant such that bullets fired will cause the sheet to deform but not penetrate the sheet. A latch on the bottom of the screen 421 can be connected to the base to keep the screen in a downward and extended position. Then, when the legs are extended through the sleeve, the user can position the screen to secure the bottom portion of the user's body not secured and covered by the shield. The screen 420 can be attached to the legs by known attachment mechanisms such as a hooks, pins or screws.

Figure 3:
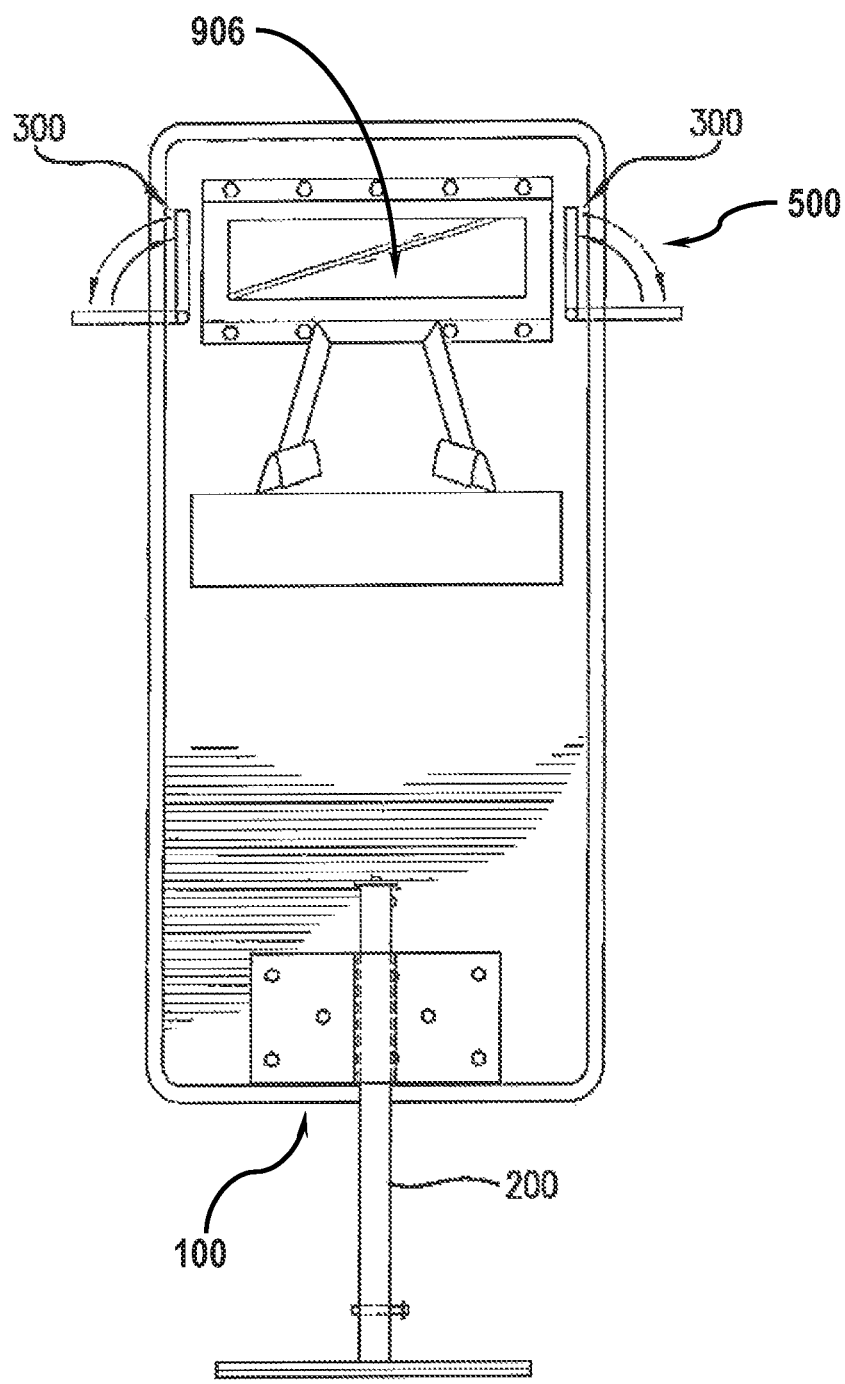
FIG. 3 is a perspective view of the present invention showing the support system having one leg and a resting platform.

The shield can be modified by resting platforms 300 on the shield, as shown in FIG. 3 and FIG. 4. FIG. 3 is a perspective of the present invention showing the support system 100 having one leg 200 and a resting platform 300. FIG. 4 is a perspective of the present invention showing the support system 100 having two legs 101, 102 and resting platforms 300. The resting platform 300 is positioned underneath the window 906 on the shield. The platform 300 is secured to the shield on one end by a hinge so that the platform can move in a closed position towards the shield or in an open position in a diagonal direction shown by 500. In an open position, the platform will move to extend over the left of right sides of the shield. When opened as shown in FIGS. 3 and 4, the user can rest his weapon on the platform. The platform is a ledge sized to receive and support the weapon.

The user can release the legs and the platform when fatigued, sore or immobile and then collapse the system when the user desires to be mobile. The shield may be raised about 4 to 5 feet and lowered to a desired height.

Figure 8:
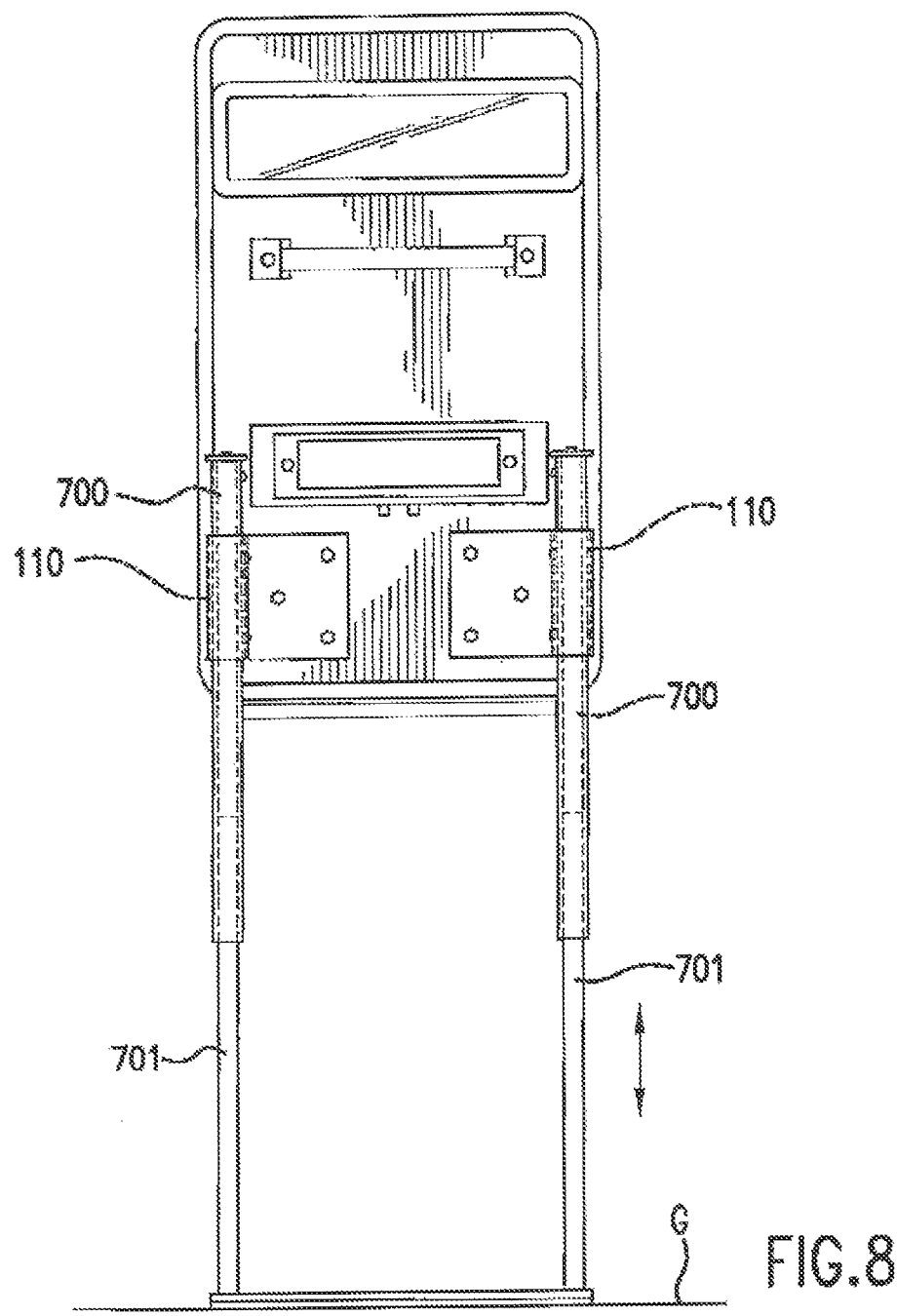
FIG. 8 is a perspective view of the present invention showing a hydraulic system which raises and lowers the legs of the support system.

FIG. 8 is a perspective view of the present invention showing a hydraulic system which raises and lowers the legs of the support system. As shown in FIG. 8, in another embodiment, a double acting hydraulic cylinder 700 extends through sleeve 110 and contacts the legs 701 enabling active movement of the so that the leg is extended downward or moved upward to lower or raise the shield and to support the shield attached to the support system at a desired height. Pressurized hydraulic fluid, which is typically oil or air, powers the cylinder 700. The hydraulic cylinder consists of a cylinder barrel, in which a piston connected to a piston rod moves up and down. Double acting hydraulic cylinders have two opposite facing piston surfaces that control the operation of the force of the hydraulic liquid. The barrel is closed on one end by the cylinder bottom and the other end by the cylinder head where the piston rod comes out of the cylinder. The piston has sliding rings and seals. The piston divides the inside of the cylinder into two chambers, the bottom chamber and the piston rod side chamber. The piston rod also has mounting attachments to connect the cylinder to the leg 701 it is moving in an upwards and downwards direction. When pressurized hydraulic fluid enters the system, the leg is moved downward towards the ground surface G. When pressurized fluid is discontinued, the leg retracts upwards.

Figure 7:
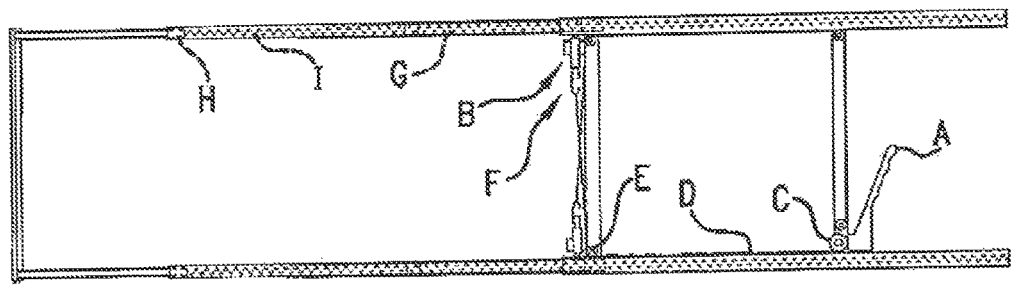
FIG. 7 is a perspective view of the present invention showing a pulley system which raises and lowers the legs of the support system.

FIG. 7 is a perspective view of the present invention showing a pulley system which raises and lowers the legs of the support system. Actuating lever (A) retracts blunt-nose spring plungers (B) via wire reel (C), wire rope (D), pulleys (E) and adjustable devises (F) permitting main spring (G) to retract upper section. Retracting upper section axially co-locates blunt nose spring plungers (B) with ball-nose spring plungers (H). Releasing lever (A) with upper section retracted causes blunt-nose spring plungers (B) to depress ball-nose plungers (H) permitting lower spring (I) to retract lower section.

FIG. 10 illustrates a supported ballistic shield system 1000 in an extended configuration, in accordance with an embodiment of the present disclosure. System 1000 is illustrated from a point of view behind the shield, as would be seen by a user of system 1000 when using shield 900. Clamp 1001 removably clamps around bottom side 904, and supports the weight of shield 900. Clamp 1001 may be rigidly coupled to sleeve 1003, e.g., by use of fasteners or welding. Sleeve 1003 is a rigid, elongated structure that is vertically situated near a central vertical axis of shield 900. Sleeve 1003 is rigidly coupled to shield 900 in at least two locations, e.g., as illustrated in FIG. 10. One point of attachment of sleeve 1003 to shield 900 is at a point in the upper half of shield 900, e.g., at point 1007. Preferably, point 1007 is below window 906 so as not to obscure a user's view through window 906. A second point of attachment of sleeve 1003 to shield 900 is through the rigid coupling of sleeve 1003 to clamp 1001. Fasteners 1015 (e.g., screws, bolts, or the like) may be used to rigidly couple sleeve 1003 to clamp 1001, e.g., by use of screw holes milled fully through clamp 1001, and partially or fully through sleeve 1003, and fastener length selected in order to not extend significantly into the interior of sleeve 1003, so that the intended movement of leg 1009 within sleeve 1003 is not significantly impeded.

Ballistic shield system 1000 further includes an extendable leg 1009, illustrated in FIG. 10 in an extended position. Leg 1009 extends vertically below and collinear with sleeve 1003. Leg 1009 may be collapsibly coupled to sleeve 1003, such as by concentric telescoping tubes, or telescoping channels of substantially rectangular cross-section, or ball bearing brackets, and so forth. An upper end of leg 1009 may be partially disposed within sleeve 1003 even when leg 1009 is extended. For example, an upper approximately 6 inches of leg 1009 may remain within sleeve 1003 in the extended configuration, in order to provide a substantially stiff coupling of leg 1009 to sleeve 1003. Leg 1009 may include a base 1011 swivably coupled to a lower end of leg 1009, e.g., by a ball-in-socket joint. Base 1011 may be rotated a full 360 degrees in a plane perpendicular to leg 1009. Base 1011 also may be tilted at a non-perpendicular angle from a major axis of leg 1009. Base 1011 helps to provide stability and to distribute the weight of system 1000 on a support surface. Leg 1009 may be reversibly locked in place in the extended position by use of one or more spring-loaded ball bearings that engage with cooperating openings in sleeve 1003 and/or clamp 1001. A reversibly locked position is a position that cannot be dislodged easily by a force encountered in routine usage except when the usage is specifically directed to undoing or unlocking the locked position.

Sleeve 1003 and/or leg 1009 may be constructed from a stiff, durable and shatter-resistant material such as machined aluminum, a polyurethane, a phenolic, or the like.

FIG. 10 illustrates sleeve 1003 coupled to a rear major surface of ballistic shield 900. One benefit of such a configuration is that ballistic shield 900 also protects sleeve 1003. However, in some embodiments (not illustrated), clamp 1001 may be turned 180 degrees with respect to shield 900 such that sleeve 1003 is coupled to an exposed front major surface of ballistic shield 900. This latter configuration may provide more room to a user behind ballistic shield 900.

An advantage of a single-leg design such as system 1000 is that, compared to a multiple-leg design, the single-leg design is lighter and may be easier to extend and to retract. In contrast, a two-leg design may be unstable if one of the legs fails to properly extend or lock in place.

In some embodiments, sleeve 1003 extends below clamp 1001, and may include a collar 1013 that may interact with a mechanical stop in order to prevent excessive travel of leg 1009 when leg 1009 is extended or retracted.

Figure 11A:
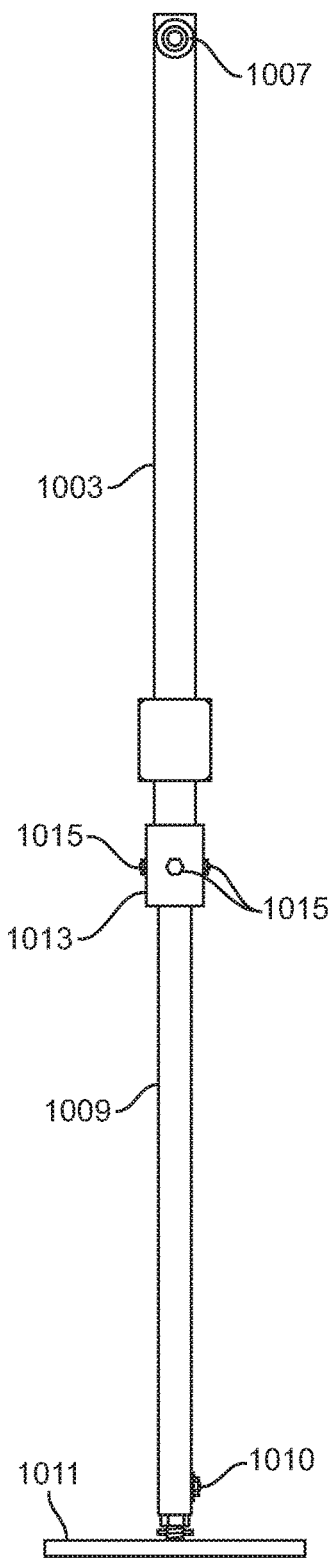
FIG. 11A is a rear plan view of an embodiment in an extended configuration without ballistic shield, in accordance with the present disclosure.

FIG. 11A illustrates ballistic shield system 1100 in an extended configuration, without attached shield 900, in accordance with an embodiment of the present disclosure. FIG. 11A is illustrated from a similar point of view as the perspective used in FIG. 10.

Figure 11B:
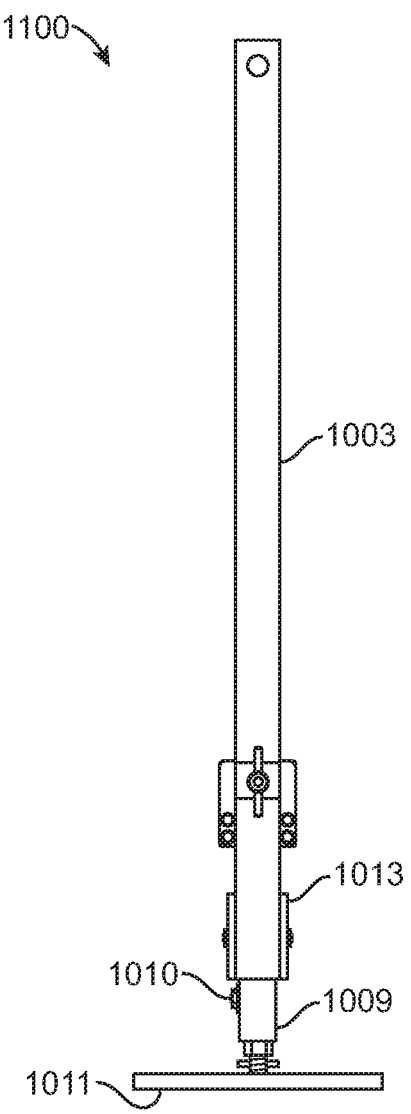
FIG. 11B is a front plan view of an embodiment in a retracted configuration without ballistic shield, in accordance with the present disclosure.

FIG. 11B illustrates ballistic shield system 1100 in a retracted configuration, without attached shield 900, in accordance with an embodiment of the present disclosure. FIG. 11B is illustrated from an opposite point of view as the perspective used in FIG. 11A, i.e., from a side that faces a dangerous situation. In the retracted configuration, leg 1009 may be nested within sleeve 1003. Leg 1009 typically would be in a retracted position when shield system 1100 is not being used actively for protection, e.g., during storage, during transportation, etc.

Leg 1009 may be maintained in a retracted position by coupling of a spring-loaded ball bearing to a corresponding aperture in sleeve 1003, as further described in connection with FIG. 11C, below.

Figure 11C:
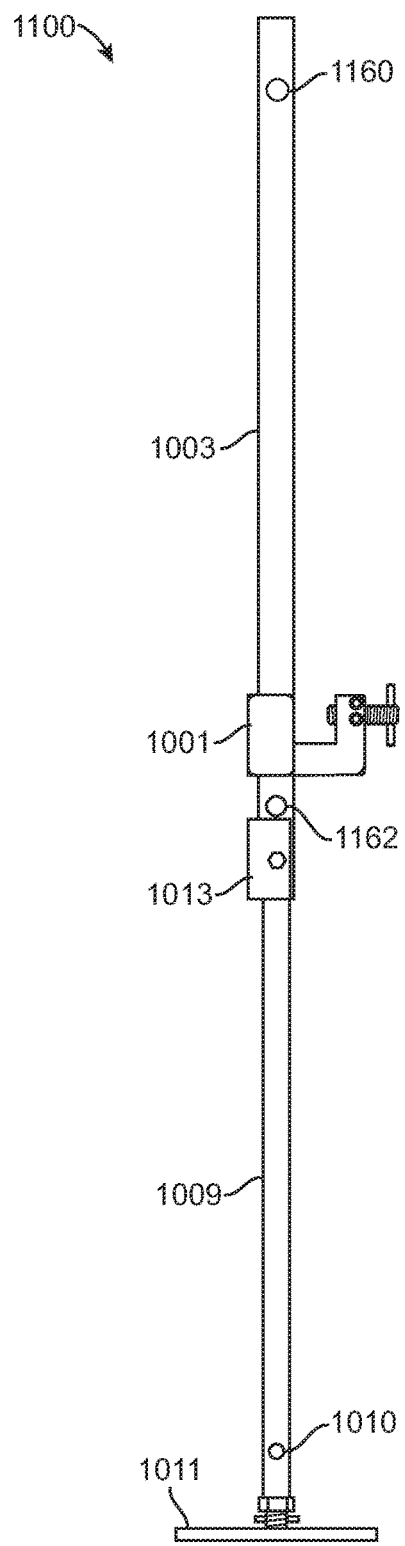
FIG. 11C is a right plan view of an embodiment in an extended configuration without ballistic shield, in accordance with the present disclosure.

FIG. 11C illustrates a right-side view of ballistic shield system 1100 in an extended configuration, without attached shield 900, in accordance with an embodiment of the present disclosure. In the illustrated perspective and when equipped with a shield, typically a user will be on the left side of system 1100, and a dangerous situation will be to the right of system 1100. Items marked with a reference number used in an earlier figure have already been described. FIG. 11C illustrates sleeve 1003 as including aperture 1160 and aperture 1162. With system 1100 in an extended configuration, leg 1009 is held in place by the force of one or more spring-loaded ball bearings, situated within leg 1009, which engage with one or more apertures 1162, respectively. The diameter of aperture 1162 is less than the diameter of the ball bearing, so that the ball bearing is pushed only partially into aperture 1162. In some embodiments, multiple sets (e.g., three sets) of spring-loaded ball bearings and corresponding apertures 1162 may be provided in order to support a greater weight of shield 900. In some embodiments, multiple apertures 1162 may be disposed upon more than one side surface of sleeve 1003.

Conversely, leg 1009 may be held in a retracted position by the force of one or more of the spring-loaded ball bearings, situated within leg 1009, coupling with aperture 1160. Aperture 1160 also has a diameter less than the diameter of a ball bearing. A different number of ball bearings may be used to hold leg 1009 in a retracted position compared to holding leg 1009 in an extended position, at least because a different amount of force is needed. When extended, the spring-loaded ball bearings and corresponding apertures 1162 need to support the weight of shield 900 plus sleeve 1003 and clamp 1001. When retracted, the spring-loaded ball bearings and corresponding apertures 1160 need to retain the weight of leg 1009 and base 1011. The weight of leg 1009 is much less than the weight of shield 900 plus sleeve 1003 plus clamp 1001.

In order to reconfigure system 1100 from the retracted configuration of FIG. 11B to the extended configuration of FIG. 11C, a user may rest base 1011 on a solid surface (e.g., ground, pavement, etc.), with system 1100 being oriented generally upright. The user would secure base 1011 (e.g., by stepping onto base 1011 with one or both feet) to hold it down, then yanking up on shield 900 so ball bearings within leg 1009 disengage with aperture 1160, and continue lifting shield 900 until the ball bearings reversibly lock in place with the one or more apertures 1162.

Conversely, in order to move system 1100 from the extended configuration of FIG. 11C to the retracted configuration of FIG. 11B, a user may provide a jolting force along an axis formed by sleeve 1003 and leg 1009. For example, a user may lift up system 1100 slightly (e.g., a few inches), then in a generally upright orientation, drop shield 1100 so that base 1011 bears the force of system 1100 impacting the solid surface. The force will be enough to force the spring-loaded ball bearings back into leg 1009, thus disengaging the ball bearings from aperture 1162, and allowing leg 1009 to retract into sleeve 1003 until at least one of the ball bearings engages with aperture 1160. If leg 1009 were to continue retracting past a point at which one of the ball bearings engages with aperture 1160, then mechanical stop 1010 engages with a stopping mechanism such as collar 1013 in order to stop leg 1009 from retracting any further. Collar 1013 may be coupled securely to sleeve 1003 by usage of fasteners, welding, or the like.

Figure 12:
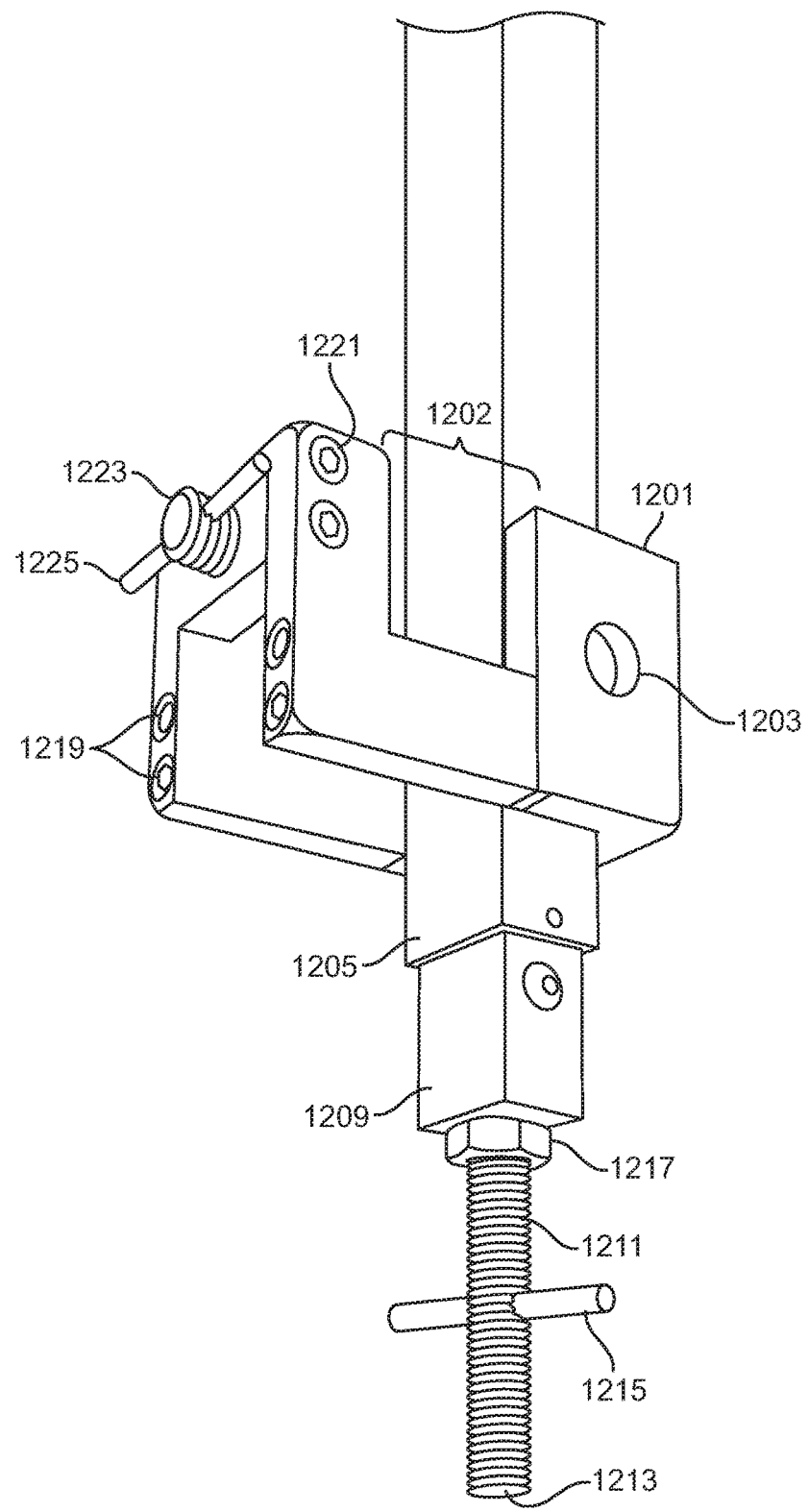
FIG. 12 is a front, lower and left oblique view of an embodiment in a retracted configuration, in accordance with the present disclosure.

FIG. 12 illustrates an embodiment of a clamp 1201, and leg 1209 in a retracted position from a bottom, front and left oblique point of view, in accordance with an embodiment of the present disclosure. Clamp 1201 includes an indentation 1202 used to receive shield 900. Clamp 1201 differs from clamp 1001 in that clamp 1201 includes one or more apertures 1203 in a side of clamp 1201 adjacent to sleeve 1205. Some embodiments of clamp 1201 may include a plurality of apertures 1203, situated along one or more sides of clamp 1201. In an assembled system, aperture 1203 may be disposed adjacent to a corresponding aperture in sleeve 1205. Aperture 1203 and a corresponding aperture (if provided) in sleeve 1205 act to receive partially a spring-loaded ball bearing disposed within leg 1209.

FIG. 12 further illustrates an optional height adjustment screw 1211 threadedly coupled to a lower end of leg 1209. A lower end 1213 of height adjustment screw 1211 is coupled to a base such as base 1011 illustrated in FIG. 11C. Height adjustment screw 1211 may include a feature (e.g., T-bar 1215) to make height adjustment screw 1211 easily manipulable by hand. Height adjustment screw 1211 may be used to set a preferred height of shield 900 when shield 900 is supported by leg 1209 in an extended configuration. The preferred height will be set infrequently (e.g., when shield 900 is first issued to a user), and locking nut 1217 may be used to keep height adjustment screw 1211 at the preferred height.

FIG. 12 illustrates clamp 1201 as including multiple sections held together by fasteners such as screws 1219, 1221. However, other embodiments of clamp 1201 may be fabricated as a single machined metal part or injection molded part, or of a stiff and shatter-resistant (e.g., non-brittle) plastic such as a polyurethane or a phenolic.

Clamp 1201 further includes an adjustment mechanism such as adjustment screw 1223. One end of adjustment screw 1223 is relatively user-accessible and may include a feature (e.g., T-bar 1225) to make adjustment screw 1223 easily manipulable by hand. Another, opposite end of adjustment screw 1223 (not illustrated in FIG. 12) is relatively inaccessible to a user, and may be tightened against shield 900 (when shield 900 is installed in indentation 1202) by turning T-bar 1225. For example, as adjustment screw 1223 is advanced toward sleeve 1205, a portion of adjustment screw 1223 (e.g., tip 1340 illustrated in FIGS. 13D-13E) may press against one major surface of shield 900 (e.g., a front surface) and tending to push an opposite major surface of shield 900 (e.g., a rear surface) against a surface of clamp 1201 (e.g., surface 1342 illustrated in FIGS. 13D-13E). Adjustment screw 1223 may be tightened until clamp 1201 is sufficiently tightly coupled to shield 900 in order to be able to frictionally hold clamp 1201 and the rest of system 1100 to shield 900 when shield 900 is in use, including when standing, being picked up to move a short distance, being swiveled to face a different direction, and so forth. In some embodiments, the opposite end of adjustment screw 1223 may be coupled to a swivel head or the like to improve the mechanical robustness of the frictional coupling of adjustment screw 1223 to shield 900. Clamp 1201 may be affixed to sleeve 1205, e.g., by friction, by welding, by use of fasteners such as screws, and so forth.

Figure 13A:
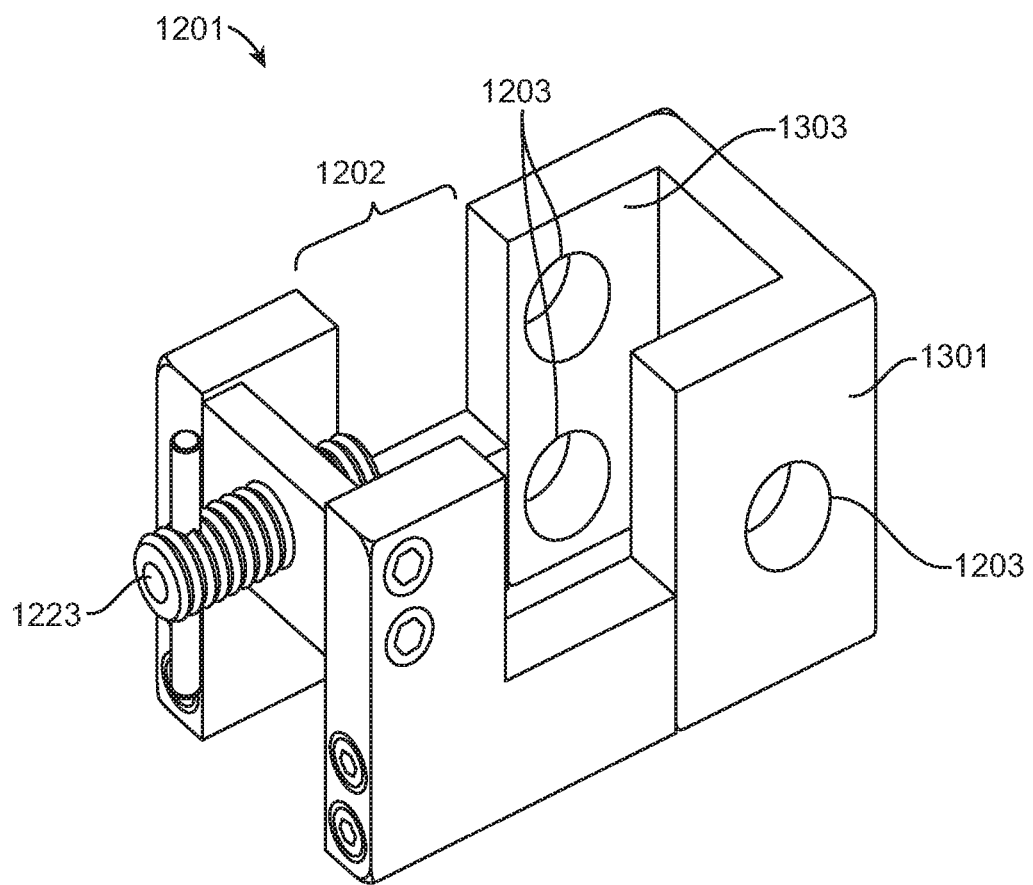
FIGS. 13A-13E are oblique views of an assembled clamp, in accordance with an embodiment of the present disclosure.

FIG. 13A illustrates an embodiment of clamp 1201 from a top, front and left oblique point of view, in accordance with an embodiment of the present disclosure. FIG. 13A illustrates another view of aperture 1203 in sidewall 1301 of clamp 1201, and additional apertures 1203 in sidewall 1303 of clamp 1201.

Figure 13B:
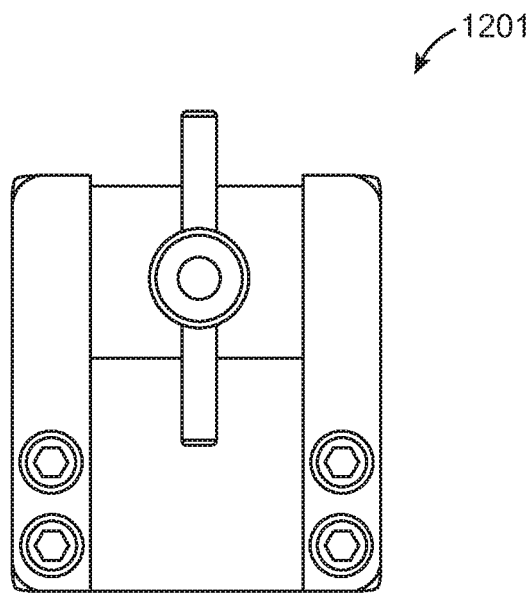
Figure 13C:
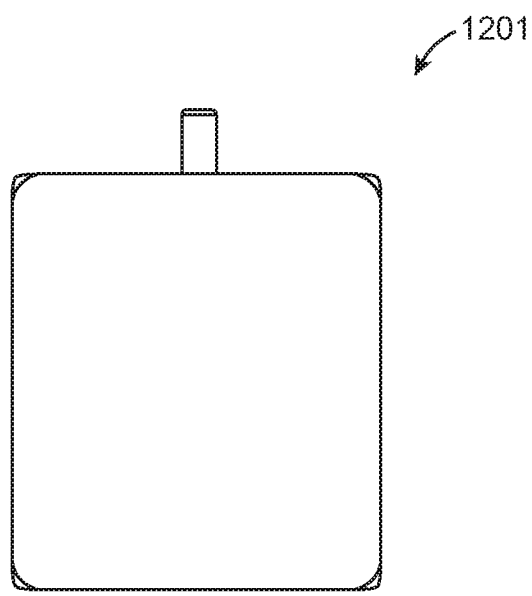

FIG. 13B illustrates an embodiment of clamp 1201 from a front point of view, in accordance with an embodiment of the present disclosure. FIG. 13C illustrates an embodiment of clamp 1201 from a rear point of view, in accordance with an embodiment of the present disclosure.

Figure 13D:
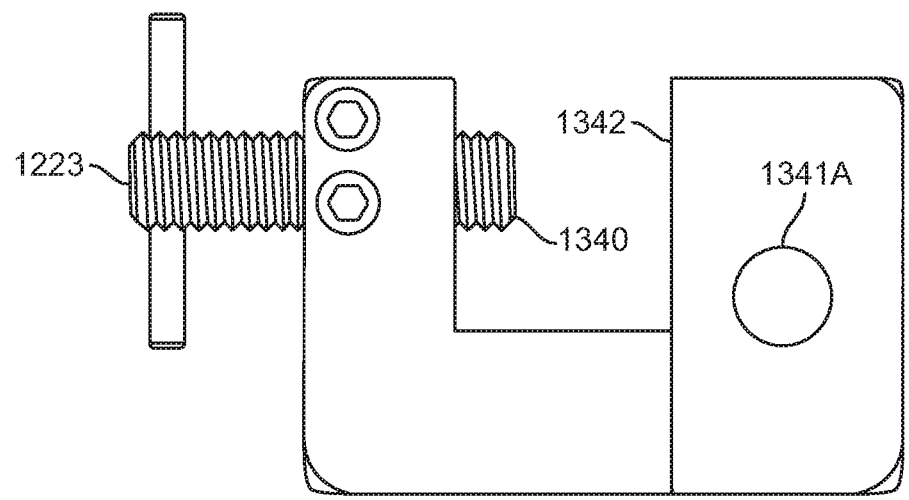
Figure 13E:
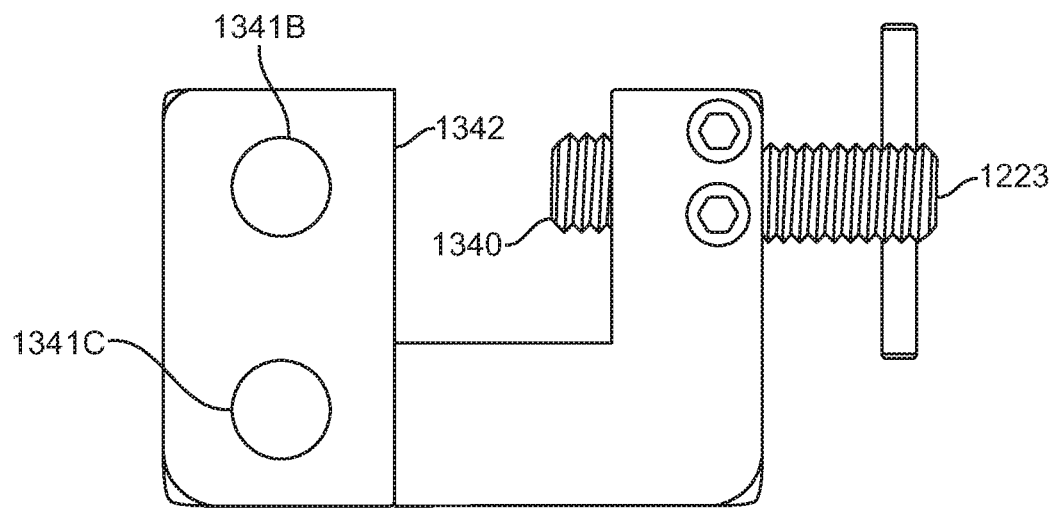

FIG. 13D illustrates an embodiment of clamp 1201 from a left point of view, and FIG. 13E illustrates the embodiment from a right point of view, in accordance with an embodiment of the present disclosure. FIGS. 13D-13E illustrate a tip 1340 of adjustment screw 1223, which when adjustment screw 1223 is adjusted, would press against shield 900 (not illustrated in FIGS. 13D-13E) in order to press shield 900 against surface 1342 of clamp 1201. Some embodiments of clamp 1201 may include optional clamp apertures 1341A-C. Clamp apertures 1341A-C, if included, would match with corresponding apertures in sleeve 1003 in order to keep leg 1009 in an extended position.

FIG. 14A illustrates a rear plan view of sleeve 1401 in accordance with an embodiment of the present disclosure. Sleeve 1401 is a hollow channel of a generally rectangular cross-sectional shape, however other cross-sectional shapes are usable such as a cylindrical channel or D-shaped channel. Sleeve 1401 includes a hole (i.e., aperture) 1405 in a front surface 1408 (visible in FIG. 14B) of sleeve 1401, and a hole 1403 in a rear surface 1406 of sleeve 1401. Hole 1405 may be used, together with a screw or bolt or the like, to attach sleeve 1401 to shield 900, e.g., at point 1007 illustrated in FIG. 10. Hole 1403 may be used to provide tool access to hole 1405 as sleeve 1401 is being attached to shield 900. Hole 1403 may have a different diameter (e.g., a larger diameter) than hole 1405.

Sleeve 1401 may be coupled to a stopper mechanism 1440. Stopper mechanism 1440 may be, for example, an indexing plunger as known in the art. Stopper mechanism 1440 may include a retractable portion that is controllable by a user, e.g., by hand. Stopper mechanism 1440 may cooperatively engage with an aperture in leg 1501 as discussed below in connection with FIGS. 15A-15D. The cooperative engagement may be used to reversibly set, limit, or lock leg 1501 in a desired position with respect to sleeve 1401, and/or to provide a hard stop to movement of leg 1501 with respect to sleeve 1401. For example, the hard stop may be provided in order to prevent leg 1501 from being overly extended such that leg 1501 would be completely removed from sleeve 1401. Stopper mechanism 1440 may be coupled to sleeve 1401 by use of, e.g., a sleeve, a clamp, a fastener, etc.

FIG. 14B illustrates a rear, top and left oblique view of sleeve 1401 in accordance with an embodiment of the present disclosure. FIG. 14B illustrates left side surface 1410, into which is formed an upper aperture 1407 and a lower aperture 1409. Upper aperture 1407 is formed toward an upper end of sleeve 1401, and cooperatively engages with a spring-loaded ball bearing in leg 1009 in order to keep leg 1009 in a retracted position. Lower aperture 1409 is formed toward a lower end of sleeve 1401, and cooperatively engages with a spring-loaded ball bearing in leg 1009 in order to keep leg 1009 in an extended position. In some embodiments, lower aperture 1409 is aligned with clamp aperture 1341A in clamp 1201 shown in FIG. 13D when sleeve 1401 and clamp 1201 are coupled together.

FIG. 14C illustrates a rear, top and right oblique view of sleeve 1401 in accordance with an embodiment of the present disclosure. FIG. 14C illustrates right side surface 1412, into which is formed a pair of lower apertures 1411. Lower apertures 1411 are formed toward a lower end of sleeve 1401, and each cooperatively engages with a respective spring-loaded ball bearing in leg 1009 in order to help keep leg 1009 in an extended position. In some embodiments, lower apertures 1411 are aligned with clamp apertures 1341B, 1341C respectively in clamp 1201 shown in FIG. 13E when sleeve 1401 and clamp 1201 are coupled together. In some embodiments, sleeve 1401 does not include a pair of apertures 1411 toward an upper end of surface 1412, so that less force is needed to move leg 1009 from a retracted position, compared to moving leg 1009 from an extended position.

Other embodiments of a leg, a sleeve and a clamp may include a different number of apertures and spring-loaded ball bearings, or may arrange the apertures on different sides or surfaces of the leg, the sleeve or the clamp, compared to the embodiments illustrated in the figures.

FIG. 15A illustrates a rear, top and right oblique view of leg 1501 in accordance with an embodiment of the present disclosure. The cross-sectional shape of leg 1501 may be matched to fit within sleeve 1401 illustrated in FIG. 14B. FIG. 15A illustrates right side surface 1510, into which is formed upper apertures 1503, 1505. Upper apertures 1503, 1505 are formed toward an upper end of leg 1501, and within each is disposed a respective spring-loaded ball bearing (not illustrated in FIG. 15A). FIG. 15A further illustrates mechanical stop 1010 protruding from surface 1510.

Leg 1501 further may include an optional aperture 1504 in a major surface 1514 of leg 1501. FIG. 15A illustrates major surface 1514 as a rear surface of leg 1501. Aperture 1504 may extend at least partially into the body of leg 1501. In some embodiments, aperture 1504 may extend completely through leg 1501. Aperture 1504 may be sized, shaped and positioned to engage cooperatively with stopper mechanism 1440 when leg 1501 is in a predefined physical position with respect to sleeve 1401. In some embodiments, leg 1501 may include more than one aperture 1504 in order to engage with stopper mechanism 1440 at more than one position of leg 1501 with respect to sleeve 1401. For example, leg 1501 may include one or more apertures 1504 located near a top end of leg 1501, and/or one or more apertures 1504 located near a bottom end of leg 1501. At least some of apertures 1504 near a top end of leg 1501 may be used to adjust a height of shield 900 when leg 1501 is in an extended position. At least some of apertures 1504 near a bottom end of leg 1501 may be used to adjust a height of shield 900 when leg 1501 is in a retracted position.

FIG. 15B illustrates a left plan view of leg 1501 in accordance with an embodiment of the present disclosure. FIG. 15B illustrates left side surface 1512, and toward an upper end of which is formed upper aperture 1507. Within aperture 1507 is disposed a spring-loaded ball bearing (not illustrated in FIG. 15B).

Each of the spring-loaded ball bearings in apertures 1503, 1505, 1507 cooperatively engages with a respective aperture in sleeve 1401 in order to keep leg 1501 in an extended position. For example, the spring-loaded ball bearing in aperture 1507 cooperatively engages with aperture 1409 in sleeve 1401 in order to help keep leg 1501 in an extended position.

Furthermore, at least one of the spring-loaded ball bearings in apertures 1503, 1505, 1507 cooperatively engages with an aperture in sleeve 1401 in order to keep leg 1501 in a retracted position. For example, the spring-loaded ball bearing in aperture 1507 may cooperatively engage with aperture 1407 in sleeve 1401 in order keep leg 1501 in a retracted position.

FIG. 15C illustrates a close-up oblique view of a lower end of leg 1501.

Figure 15D:
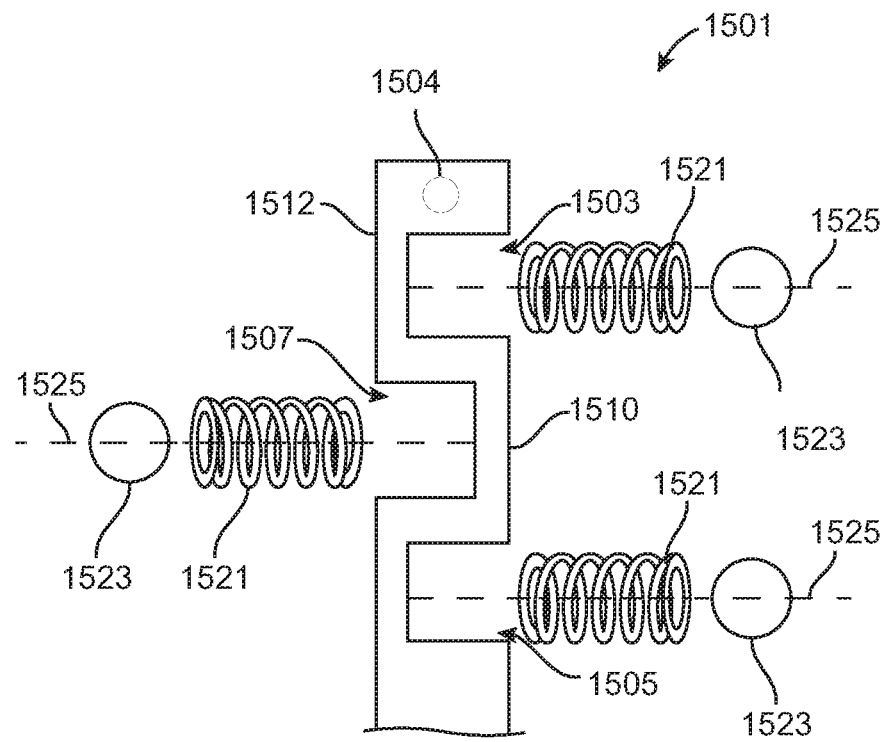
FIG. 15D is an exploded, cross-sectional view of a portion of leg in accordance with an embodiment of the present disclosure.

FIG. 15D illustrates an exploded, cross-sectional view of a portion of leg 1501. The contents of each of apertures 1503, 1505, 1507 are illustrated as being exploded along respective axes 1525. The contents of each of apertures 1503, 1505, 1507 includes a respective coil spring 1521 and a respective ball bearing 1523. The diameters of springs 1521 and ball bearings 1523 are slightly smaller than the diameters of their respective apertures 1503, 1505 or 1507, in order to allow springs 1521 and ball bearings 1523 to travel within respective apertures 1503, 1505 or 1507. When apertures 1503, 1505 or 1507 are not aligned with respective apertures in sleeve 1401, the respective spring 1521 will be compressed such that an outward-facing surface of respective ball bearing 1523 will be substantially flush with surface 1510 or surface 1512.

Each of apertures 1503, 1505, 1507 includes an open end toward which respective ball bearing 1523 faces, and a respective end that is at least partially enclosed and is opposite from the respective open end. Each at least partially enclosed end provides a surface against which respective spring 1521 may push, in order to push respective ball bearing 1523 toward the open end of respective apertures 1503, 1505, 1507. The at least partially enclosed end may be, for example, completely enclosed as illustrated in FIG. 15D, or may include an opening smaller than the diameter of respective spring 1521, or may be partially enclosed by a bar or other blocking member to prevent respective spring 1521 from falling out the respective at least partially enclosed end.

Figure 16:
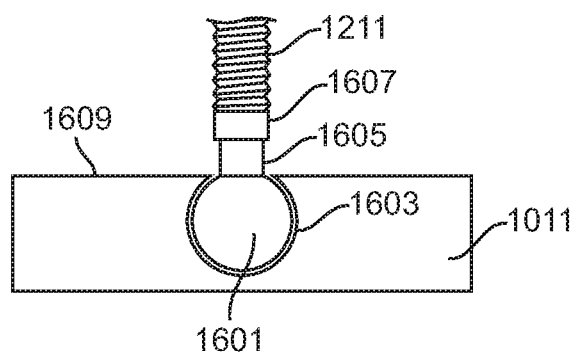
FIG. 16 is a cross-sectional view of a base.

FIG. 16 illustrates a cross-sectional view of base 1011, in accordance with an embodiment of the present disclosure. Base 1011 includes an upper major surface 1609, and a ball-in-socket joint comprising a spherical ball 1601 situated at least partially within spherical socket 1603. A portion of an upper surface of ball 1601 may extend above surface 1609 in order to increase a range of motion of the ball-in-socket joint. A stem 1605 may be coupled to ball 1601, and stem 1605 may be coupled to height adjustment screw 1211 by use of nut 1607 or the like. In other embodiments, stem 1605 may be hollow and internally threaded in order to be threaded onto the lower end of height adjustment screw 1211. The ball-in-socket joint allows a wide range of motion of base 1011, e.g., a 360 degree range of horizontal rotation by base 1011, and a predetermined solid angle by height adjustment screw 1211 around vertical (i.e., around a direction perpendicular to surface 1609). In some embodiments, the predetermined solid angle may be at least at least 15 degrees, or at least 30 degrees, or at least 45 degrees.

Figure 17A:
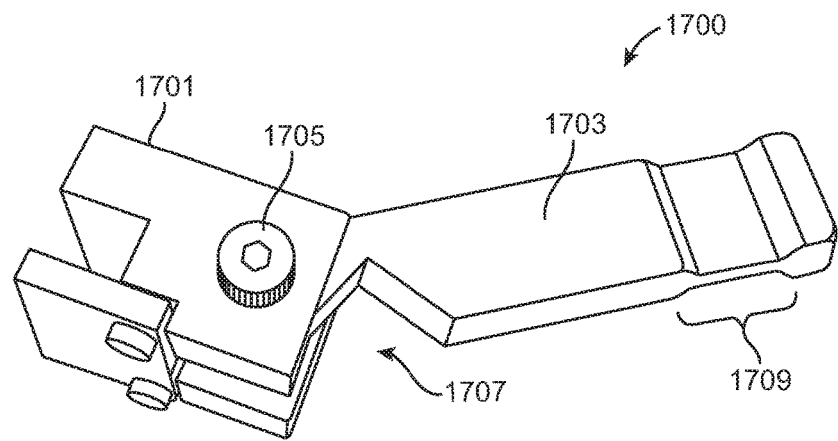
FIGS. 17A-17C are views of a support arm in accordance with an embodiment of the present disclosure.

FIG. 17A illustrates an optional side rest 1700 in a substantially unfolded configuration, in accordance with an embodiment of the present disclosure. Side rest 1700 may be used to provide a support for an arm or a weapon (e.g., a rifle or other firearm), along a side of shield 900, when shield 900 is being supported as illustrated in FIG. 10. Side rest 1700 includes a clamp 1701 that clamps to a side of shield 900, at a location selected by the user. Clamp 1701 typically will be clamped to shield 900 at about the user's shoulder-height when shield 900 is being supported as illustrated in FIG. 10. Side rest 1700 typically would be clamped to shield 900 at least on a side corresponding to the user's dominant side, i.e., on the right of shield 900 for a right-handed user and on the left of shield 900 for a left-handed user. In some embodiments, separate side rests 1700 may coupled simultaneously to both the left and right sides of shield 900, respectively.

Side rest 1700 further includes a pivotable arm 1703, which pivots around pivot 1705. Some embodiments of side rest 1700 may include a notch-like trough 1709, which may be shaped or contoured to match and receive a weapon (e.g., a rifle or other firearm), so that the weapon will be less likely to accidentally slide off the end of pivotable arm 1703.

Pivotable arm 1703 may pivot in order to allow side rest 1700 to be compacted when it is not needed, e.g., during storage or transportation. To facilitate the pivoting, pivotable arm 1703 may include a notch 1707 that facilitates a degree of rotation that might otherwise be obstructed by a portion of clamp 1701.

Figures 17B, 17C:
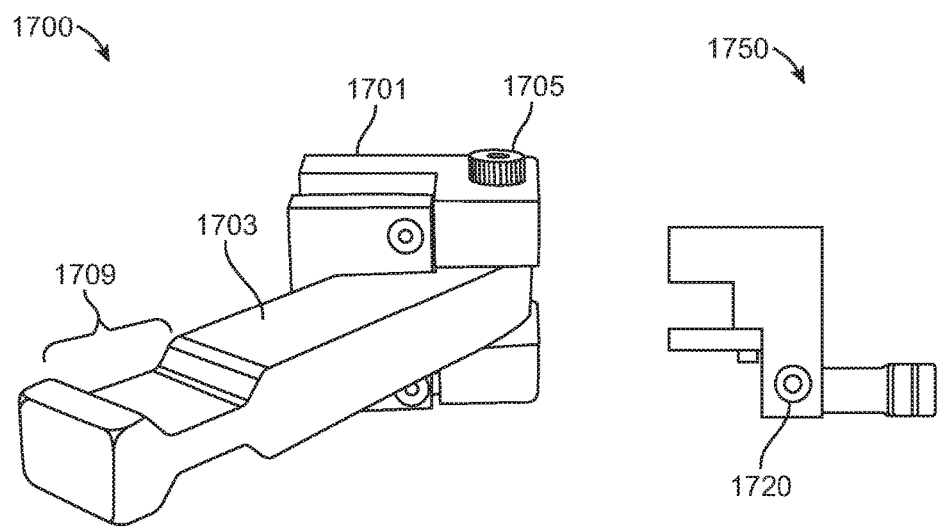

FIG. 17B illustrates optional side rest 1700 in a substantially folded configuration, in accordance with an embodiment of the present disclosure. FIG. 17C illustrates an embodiment of a side rest 1750, in which the axis of pivot 1720 may be offset toward the rear of side rest 1750. An advantage of side rest 1750 of FIG. 17C is that no notch 1707 may be necessary.

Figure 18A:
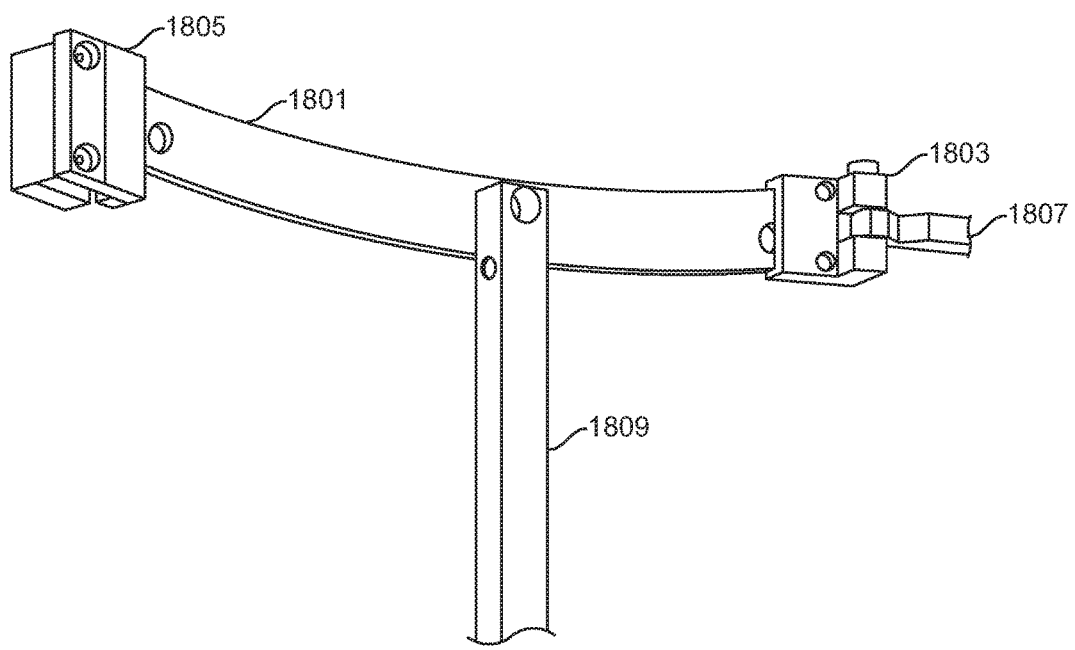
FIG. 18A is a lower, left, rear oblique view of an optional cross-arm in accordance with an embodiment of the present disclosure.

FIG. 18A illustrates an optional cross-arm 1801 in accordance with an embodiment of the present disclosure. Optional cross-arm 1801 may be integrated with ballistic shield system 1000. Cross-arm 1801 provides a structure to help support and to help stabilize shield 900 when shield 900 is in use. Cross-arm 1801 is a horizontally-elongated structure that extends from left side 902 to right side 903 of shield 900. Cross-arm 1801 may be substantially contoured to a rear major surface of shield 900. For example, if the rear major surface of shield 900 includes a forward bowing from the perspective of a user behind shield 900, then cross-arm 1801 may include a corresponding forward bowing in a horizontal plane.

A central portion of cross-arm 1801 may be securely coupled to sleeve 1809, e.g., by fastener or by welding. A right lateral end of cross-arm 1801 may be securely coupled to right side 903 of shield 900 by use of a right clamp 1803. A left lateral end of cross-arm 1801 may be securely coupled to left side 902 of shield 900 by use of a left clamp 1805. Right clamp 1803 may include a pivotable arm 1807, similar to pivotable arm 1703. Left clamp 1805 may also include a similar pivotable arm (not illustrated in FIG. 18A). Usage of left clamp 1805, right clamp 1803, and the coupling of cross-arm 1801 to sleeve 1809 allows for sleeve 1809 and cross-arm 1801 to be securely coupled to shield 900 along an upper end of sleeve 1809, without a need to detach and reattach a fastener to shield 900, unlike the attachment at point 1007 as illustrated in FIG. 10.

Figure 18B:
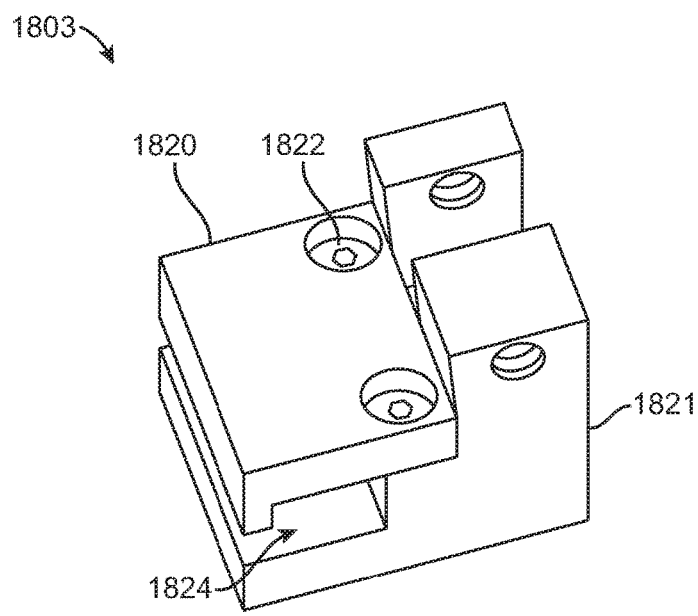
FIG. 18B is an oblique view of a right clamp in accordance with an embodiment of the present disclosure.

FIG. 18B illustrates an expanded view of right clamp 1803 in accordance with an embodiment of the present disclosure. Pivotable arm 1807 is omitted for clarity. Right clamp 1803 is clamped to right side 903 of shield 900 by enclosing a portion of right side 903 in channel 1824, and tightening removable part 1820 to main body 1821, e.g., by tightening one or more screws 1822.

Figure 18C:
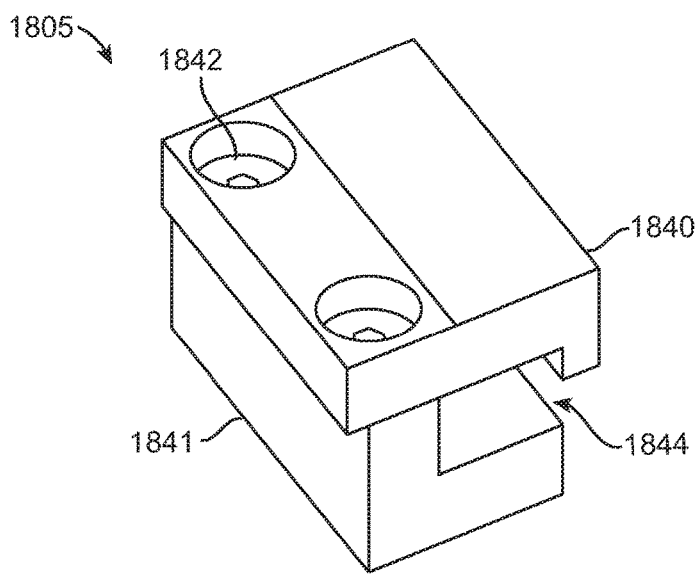
FIG. 18C is an oblique view of a left clamp in accordance with an embodiment of the present disclosure.

FIG. 18C illustrates an expanded view of left clamp 1805 in accordance with an embodiment of the present disclosure. Left clamp 1805 is clamped to left side 902 of shield 900 by enclosing a portion of left side 902 in channel 1844, and tightening removable part 1840 to main body 1841, e.g., by tightening one or more screws 1842. In another embodiment (not illustrated), left clamp 1805 may be a mirror image of right clamp 1803.

Figure 18D:
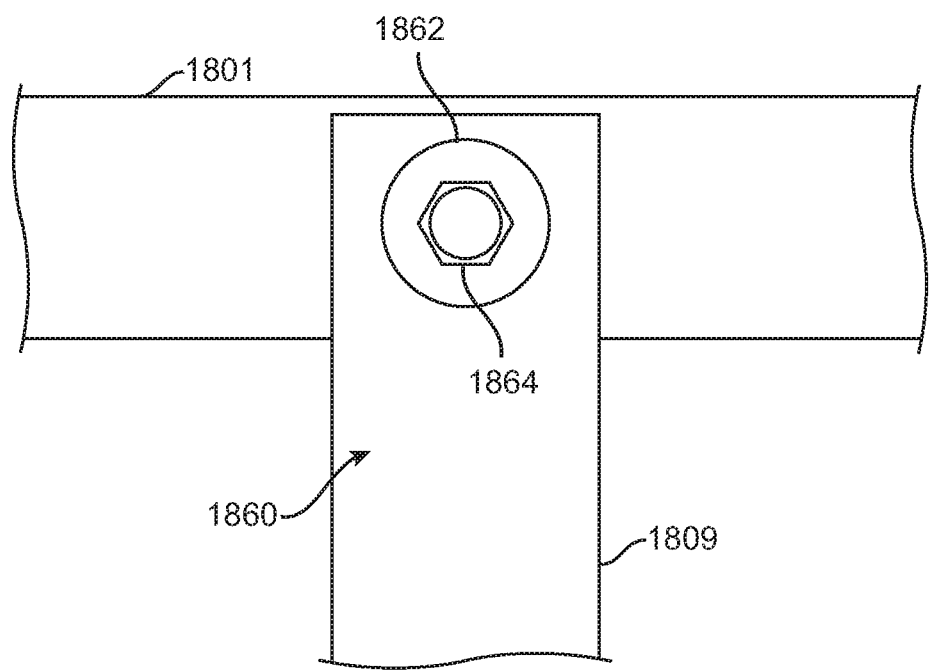
FIG. 18D illustrates a plan view of a junction of a cross-arm with a sleeve, in accordance with an embodiment of the present disclosure.

FIG. 18D illustrates an expanded view of a junction of cross-arm 1801 with sleeve 1809, in accordance with an embodiment of the present disclosure. Sleeve 1809 includes a front major surface 1860, within which an aperture 1862 is formed near a top vertical portion of surface 1860. Aperture 1862 allows access to a fastening apparatus 1864, which attaches cross-arm 1801 with sleeve 1809. FIG. 18D illustrates fastening apparatus 1864 as a screw and nut, but other kinds of fastening apparatus 1864 may be used, such as a welded joint. Fastening apparatus 1864 does not necessarily attach directly to shield 900 or to any screws of shield 900.

Figure 19:
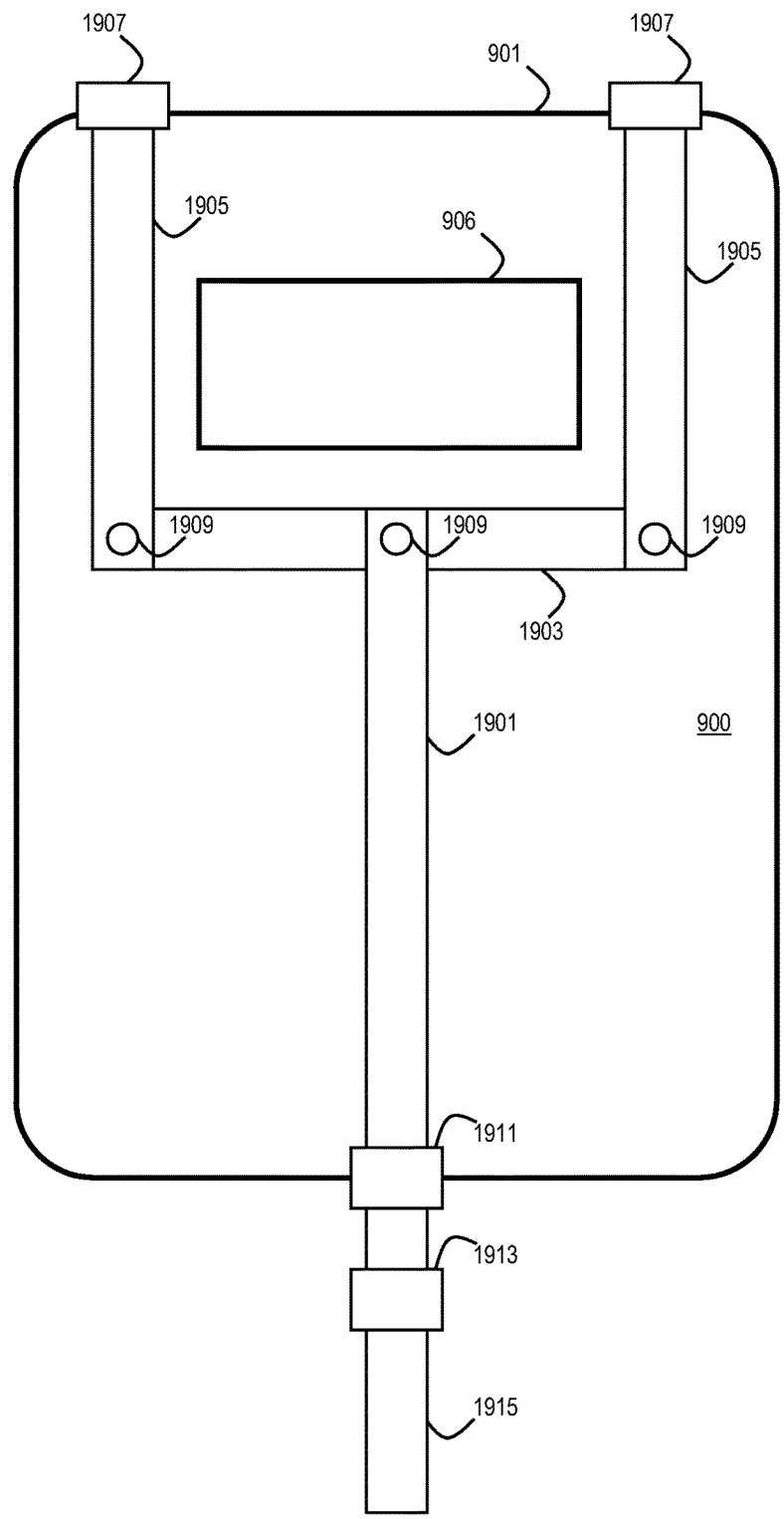
FIG. 19 illustrates a rear plan view of a top clamp assembly in accordance with an embodiment of the present disclosure.

FIG. 19 illustrates a plan view of a top clamp assembly 1900 in accordance with an embodiment of the present disclosure. Assembly 1900 includes a pair of top clamps 1907 that are rigidly but removably coupled to top side 901 of shield 900. Top clamps 1907 each may be similar to clamp 1201 or 1805. Top clamps 1907 in turn are coupled rigidly to upright arms 1905. Upright arms 1905 may be coupled rigidly to respective lateral ends a horizontal cross-arm 1903 that runs below window 906. Horizontal cross-arm 1903 may take on a curved shape to conform to a curvature in shield 900, similar to cross-arm 1801 of FIG. 18A. Horizontal cross-arm 1903 may couple rigidly to vertical sleeve 1901, which is similar to sleeve 1003. Assembly 1900 may include a bottom clamp 1911, similar to clamp 1001, which couples sleeve 1901 to shield 900. Sleeve 1901 may be coupled to collar 1913, similar to collar 1013. Collar 1913 couples sleeve 1901 to leg 1915. Components of assembly 1900 further coupled to leg 1915 are omitted for sake of clarity.

In some embodiments, assembly 1900 further may include one or more fasteners 1909 (e.g., bolts or the like) to rigidly couple horizontal cross-arm 1903 to upright arms 1905 and/or sleeve 1901. In other embodiments, horizontal cross-arm 1903, upright arms 1905 and/or sleeve 1901 may be coupled by other means, such as by welding or by fabricating the parts from a single piece of material, or some combination of such methods, and so forth.

In operation, assembly 1900 (and in particular bottom clamp 1911) supports the weight of shield 900, similarly to the embodiment shown in FIG. 10. Top clamps 1907, by gripping top side 901, together provide stability when assembly 1900 is coupled to shield 900, such that shield is prevented from falling off assembly 1900. In some embodiments, assembly 1900 is rigidly coupled to shield 900 only via top clamps 1907 and bottom clamp 1911. In other embodiments, assembly 1900 may be coupled to shield 900 at further points, such as via one or more of fasteners 1909.

The invention has been described in detail with particular reference to certain preferred embodiments thereof, but it will be understood that variations and modifications can be effected within the spirit and scope of the invention.

What is claimed is:

1. A ballistic shield support system, comprising:
    a ballistic shield comprising a first major surface, a second major surface disposed opposite from the first major surface, a top edge, a bottom edge, a left edge on the left side of the second major surface, and a right edge on the right side of the second major surface;
    a clamp rigidly coupled to a central portion of the bottom edge of the ballistic shield;
    a vertical sleeve rigidly coupled at a first position to the clamp, and rigidly coupled at a second position to the ballistic shield, the vertical sleeve having a vertical major axis when coupled to the ballistic shield;
    a support leg retractably coupled to the vertical sleeve, the support leg sliding between a retracted position and an extended position, along a direction parallel to the vertical major axis of the sleeve; and
    a base coupled to a lower end of the support leg.

2. The ballistic shield support system of claim 1, wherein the clamp comprises:
    an indentation to receive the bottom edge of the ballistic shield;
    a clamp surface along a vertical side of the indentation to receive a major surface of the ballistic shield; and
    an adjustment mechanism to press the ballistic shield against the clamp surface.

3. The ballistic shield support system of claim 1, wherein the support leg telescopically moves within the vertical sleeve.

4. The ballistic shield support system of claim 1, wherein the base is coupled to the lower end of the support leg by a ball in socket joint.

5. The ballistic shield support system of claim 1, wherein the support leg further comprises:
- a plurality of apertures;
- a respective ball bearing positioned at least partially within each of the plurality of apertures; and
- a respective spring within each of the plurality of apertures, positioned between the respective ball bearing and an at least partially enclosed end of the respective aperture.

6. The ballistic shield support system of claim 5, wherein the vertical sleeve further comprises:
- an upper aperture situated on a side surface of the vertical sleeve to receive at least partially a ball bearing from the support leg when the support leg is in the retracted position; and
- a plurality of lower apertures situated on at least one side surface of the vertical sleeve, each lower aperture to receive at least partially a respective ball bearing from the support leg when the support leg is in the extended position.

7. The ballistic shield support system of claim 6, wherein a number of ball bearings used to hold the support leg in the extended position is greater than a number of ball bearings used to hold the support leg in the retracted position.

8. The ballistic shield support system of claim 5, wherein the clamp further comprises:
- a plurality of clamp apertures situated on at least one side surface of the clamp, each clamp aperture to receive at least partially a respective ball bearing from the support leg when the support leg is in the extended position.

9. The ballistic shield support system of claim 1, wherein the ballistic shield support system supports a weight of the ballistic shield.

10. The ballistic shield support system of claim 1, wherein the support leg further comprises a mechanical stop positioned to prevent excessive travel of the support leg when moving the support leg into a retracted position.

11. The ballistic shield support system of claim 1, wherein the support leg further comprises a height adjustment screw to adjust a height of the ballistic shield when the support leg is in an extended position.

12. The ballistic shield support system of claim 1, wherein the vertical sleeve comprises a collar disposed around a lower end of the vertical sleeve.

13. The ballistic shield support system of claim 1, further comprising a foldable rest removably coupled to a side of the ballistic shield.

14. The ballistic shield support system of claim 13, wherein the foldable rest comprises a foldable arm with at least one notch, wherein the foldable arm is movable between a folded position at least partially behind the ballistic shield, and an unfolded position to a side of the ballistic shield.

15. The ballistic shield support system of claim 14, wherein the notch is contoured to support a firearm.

16. The ballistic shield support system of claim 14, wherein the notch is contoured to facilitate folding of the foldable rest.

17. The ballistic shield support system of claim 1, further comprising a cross-arm to couple the vertical sleeve to the ballistic shield.

18. The ballistic shield support system of claim 1, further comprising:
- a cross-arm horizontally and rigidly coupled to a top end of the vertical sleeve;
- a pair of upright arms vertically and rigidly coupled to respective lateral ends of the cross-arm; and
- a respective top clamp coupled to a top end of each upright arm, the top clamps each removably coupled to the top edge of the ballistic shield.

\* \* \* \* \*